(12) United States Patent
Weaver et al.

(10) Patent No.: US 11,655,719 B2
(45) Date of Patent: May 23, 2023

(54) AIRFOIL ASSEMBLY

(71) Applicant: General Electric Company, Schenectady, NY (US)

(72) Inventors: Matthew Mark Weaver, Loveland, OH (US); Dennis Paul Dry, Cincinnati, OH (US); Todd William Bachmann, Edgewood, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/232,721

(22) Filed: Apr. 16, 2021

(65) Prior Publication Data

US 2022/0333491 A1    Oct. 20, 2022

(51) Int. Cl.
| | | |
|---|---|---|
| *F01D 5/26* | (2006.01) | |
| *F01D 5/30* | (2006.01) | |
| *F01D 5/10* | (2006.01) | |

(52) U.S. Cl.
CPC .......... *F01D 5/26* (2013.01); *F01D 5/10* (2013.01); *F01D 5/3046* (2013.01); *F01D 5/3084* (2013.01); *F05D 2240/11* (2013.01); *F05D 2300/6033* (2013.01)

(58) Field of Classification Search
CPC . F01D 5/26; F01D 5/10; F01D 5/3046; F01D 5/22; F01D 25/04; F01D 25/06
See application file for complete search history.

(56) References Cited

U.S. PATENT DOCUMENTS

| | | |
|---|---|---|
| 814,757 A | 3/1906 | Wilkinson |
| 3,235,346 A | 2/1966 | Hucke |
| 3,487,879 A | 1/1970 | McCarthy et al. |
| 3,981,609 A | 9/1976 | Koenig |
| 4,013,376 A | 3/1977 | Bisson et al. |
| 4,037,990 A | 7/1977 | Harris |
| 4,045,149 A | 8/1977 | Ravenhall |
| 4,767,271 A | 8/1988 | Catlow |
| 4,868,963 A | 9/1989 | Corsmeier et al. |
| 4,966,527 A | 10/1990 | Merz |
| 5,007,800 A | 4/1991 | Hacault et al. |
| 5,017,092 A | 5/1991 | Violette et al. |
| 5,163,817 A | 11/1992 | Violette et al. |
| 5,198,282 A | 3/1993 | Baker et al. |

(Continued)

FOREIGN PATENT DOCUMENTS

EP    2108785 A2    10/2009

*Primary Examiner* — Michael L Sehn
(74) *Attorney, Agent, or Firm* — Dority & Manning, P.A.

(57) ABSTRACT

An airfoil assembly for a turbine engine defines an axial direction, a radial direction, and a circumferential direction, and includes a first airfoil defining a first end along the radial direction, a first hub disposed on the first end of the first airfoil and having a first extension member extending at least partially in the radial direction, and a second airfoil adjacent to the first airfoil, the second airfoil defining a first end along the radial direction, a second hub disposed on the first end of the second airfoil and comprising a second extension member extending at least partially in the radial direction, and a circumferential bias assembly operable with the first extension member, the second extension member, or both for exerting a circumferential force on the first extension member, the second extension member, or both.

18 Claims, 13 Drawing Sheets

(56) References Cited

U.S. PATENT DOCUMENTS

| | | | |
|---|---|---|---|
| 5,314,307 | A | 5/1994 | Farmer |
| 5,405,245 | A | 4/1995 | Cornelius |
| 5,409,353 | A | 4/1995 | Imbault |
| 5,436,042 | A | 7/1995 | Lau et al. |
| 5,639,211 | A * | 6/1997 | Bintz ............... F01D 11/02 415/173.7 |
| 5,762,472 | A | 6/1998 | Pizzi et al. |
| 6,024,898 | A | 2/2000 | Steibel et al. |
| 6,042,334 | A * | 3/2000 | Schilling ........... F01D 11/001 415/170.1 |
| 6,506,022 | B2 | 1/2003 | Bunker |
| 6,857,856 | B2 | 2/2005 | Potter et al. |
| 7,169,465 | B1 | 1/2007 | Karandikar et al. |
| 7,217,089 | B2 | 5/2007 | Durocher et al. |
| 7,291,946 | B2 | 11/2007 | Clouse et al. |
| 7,300,255 | B2 | 11/2007 | Potter et al. |
| 7,510,379 | B2 | 3/2009 | Marusko et al. |
| 7,550,107 | B2 | 6/2009 | Morrison et al. |
| 7,771,171 | B2 | 8/2010 | Mohr et al. |
| 7,824,152 | B2 * | 11/2010 | Morrison ........... F01D 25/246 415/200 |
| 8,016,565 | B2 | 9/2011 | Berg et al. |
| 8,087,881 | B1 | 1/2012 | Cardoso, III et al. |
| 8,105,016 | B2 | 1/2012 | Butz et al. |
| 8,151,437 | B2 | 4/2012 | Muller et al. |
| 8,206,118 | B2 | 6/2012 | Propheter-Hinckley et al. |
| 8,231,354 | B2 | 7/2012 | Campbell et al. |
| 8,398,366 | B2 | 3/2013 | Twell |
| 8,491,743 | B2 | 7/2013 | Pham et al. |
| 8,794,925 | B2 | 8/2014 | McCaffrey |
| 8,864,472 | B2 | 10/2014 | Gignoux et al. |
| 8,978,729 | B2 | 3/2015 | Pham et al. |
| 8,979,486 | B2 | 3/2015 | Rioux |
| 9,090,027 | B2 | 7/2015 | Sutton et al. |
| 9,163,519 | B2 | 10/2015 | Kleinow et al. |
| 9,259,858 | B2 | 2/2016 | Gupta et al. |
| 9,482,108 | B2 | 11/2016 | Garcia Crespo |
| 9,499,253 | B1 | 11/2016 | White |
| 9,739,156 | B2 | 8/2017 | Boeck et al. |
| 9,790,809 | B2 | 10/2017 | Dube et al. |
| 9,903,210 | B2 | 2/2018 | Evans et al. |
| 9,932,901 | B2 | 4/2018 | Sener |
| 9,995,155 | B2 | 6/2018 | Carnell |
| 10,569,481 | B2 | 2/2020 | Gallier et al. |
| 2003/0024630 | A1 | 2/2003 | George et al. |
| 2003/0163984 | A1 | 9/2003 | Seda et al. |
| 2004/0163262 | A1 | 8/2004 | King et al. |
| 2005/0158171 | A1 | 7/2005 | Carper et al. |
| 2009/0097979 | A1 | 4/2009 | Erdmann et al. |
| 2009/0165924 | A1 | 7/2009 | Steibel et al. |
| 2011/0206522 | A1 | 8/2011 | Alvanos et al. |
| 2012/0255870 | A1 | 10/2012 | Rebak et al. |
| 2012/0301317 | A1 | 11/2012 | Alvanos et al. |
| 2013/0004296 | A1 | 1/2013 | Propheter-Hinckley et al. |
| 2013/0011271 | A1 | 1/2013 | Shi et al. |
| 2013/0052032 | A1 | 2/2013 | Fachat et al. |
| 2013/0064668 | A1 | 3/2013 | Paige, II et al. |
| 2013/0185924 | A1 | 7/2013 | Bellanger et al. |
| 2013/0251939 | A1 | 9/2013 | Kleinow |
| 2014/0294572 | A1 | 10/2014 | Hillier et al. |
| 2015/0211636 | A1 | 7/2015 | Panchal et al. |
| 2016/0003094 | A1 | 1/2016 | Renggli et al. |
| 2016/0138406 | A1 | 5/2016 | Freeman |
| 2016/0265370 | A1 | 9/2016 | Benson |
| 2016/0341052 | A1 | 11/2016 | Li et al. |
| 2017/0101873 | A1 | 4/2017 | Morgan et al. |
| 2017/0122113 | A1 | 5/2017 | Kittleson et al. |
| 2017/0130593 | A1 | 5/2017 | Weaver |
| 2017/0211590 | A1 | 7/2017 | Moniz et al. |
| 2017/0362941 | A1 | 12/2017 | Craig, III |
| 2018/0238188 | A1 | 8/2018 | Shoemaker et al. |
| 2018/0370158 | A1 | 12/2018 | Gallier et al. |
| 2019/0093489 | A1 | 3/2019 | Mondal et al. |
| 2019/0338656 | A1 | 11/2019 | Weaver |
| 2019/0338658 | A1 | 11/2019 | Weaver |
| 2020/0072061 | A1 | 3/2020 | Weaver et al. |

\* cited by examiner

AIRFOIL ASSEMBLY

FIELD

The present subject matter relates generally to gas turbine engines. More specifically, the subject matter relates to a shroud assembly for airfoils of gas turbine engines.

BACKGROUND

Gas turbine engines include various components that are subjected to high temperatures. As an example of such a component, turbine airfoils downstream of a combustor of the gas turbine engine experience extremely high temperatures.

For components that experience such high temperatures, non-traditional high temperature composite materials, such as ceramic matrix composite (CMC) materials, may be used. Composite materials typically include reinforcement materials and matrix materials. CMC materials are a type of composite materials in which both the reinforcement materials and matrix materials are formed of ceramics. The reinforcement materials and matrix materials may be formed of the same type of ceramics, or different types of ceramics. Components fabricated from CMC materials have a higher temperature capability compared with typical components, e.g., metal components, which may allow improved component performance and/or increased system temperatures, with reduced cooling flow to the CMC components.

BRIEF DESCRIPTION

Aspects and advantages of the invention will be set forth in part in the following description, or may be obvious from the description, or may be learned through practice of the invention.

According to one or more embodiments, an airfoil assembly for a turbine engine defining an axial direction, a radial direction, and a circumferential direction, comprises a first airfoil defining a first end along the radial direction; a first hub disposed on the first end of the first airfoil and comprising a first extension member extending at least partially in the radial direction; a second airfoil adjacent to the first airfoil, the second airfoil defining a first end along the radial direction; a second hub disposed on the first end of the second airfoil and comprising a second extension member extending at least partially in the radial direction, and a circumferential bias assembly operable with the first extension member, the second extension member, or both for exerting a circumferential force on the first extension member, the second extension member, or both.

According to one or more embodiments, the circumferential bias assembly is a first shroud assembly, and the first shroud assembly comprises a first spring member coupled to the first extension member, positioned adjacent to the first extension member, or both.

According to one or more embodiments, the airfoil assembly further comprises a second circumferential bias assembly configured as a second shroud assembly, the second shroud assembly comprises a second spring member coupled to the second extension member, positioned adjacent to the second extension member, or both, and the first spring member is configured to exert a circumferential load against the second hub.

According to one or more embodiments, the first hub and the second hub are torsional springs, and the first hub exerts a torsional force on the second hub.

According to one or more embodiments, the airfoil assembly further comprises a plurality of adjacent airfoils in addition to the first and second airfoils, the plurality of adjacent airfoils comprises a third airfoil at one end of the plurality of adjacent airfoils and a fourth airfoil at the other end of the plurality of adjacent airfoils, the third airfoil is adjacent to the second airfoil and a second spring member of the second airfoil exerts a circumferential load on a third hub disposed on the third airfoil, and the fourth airfoil is adjacent to the first airfoil and a fourth spring member of the fourth airfoil exerts a circumferential load on the first hub.

According to one or more embodiments, the first extension member is part of a first pair of extension members spaced apart in the axial direction to define a first space therebetween, and the first shroud assembly is disposed in the first space between the first pair of extension members.

According to one or more embodiments, the airfoil assembly further comprises a second airfoil adjacent to the first airfoil, the second airfoil defining a first end along the radial direction; a second hub disposed on the first end of the second airfoil and comprising a second pair of extension members extending at least partially in the radial direction, the second pair of extension members being spaced apart in the axial direction to define a second space therebetween; and a second circumferential bias assembly configured as a second shroud assembly, the second shroud assembly comprises a second spring member disposed in the second space between the second pair of extension members, and the first spring member is configured to exert a circumferential load against the second hub.

According to one or more embodiments, the second hub comprises an axial wall extending in the axial direction from one of the second pair of extension members, and the first spring member exerts the circumferential load on the second axial wall.

According to one or more embodiments, the second spring member is attached to the other of the second pair of extension members.

According to one or more embodiments, the first shroud assembly further comprises a sealing element coupled to or formed with the first spring member.

According to one or more embodiments, the first spring member is a sheet metal spring.

According to one or more embodiments, the first end of the first airfoil on which the first hub is disposed is an inner end along the radial direction.

According to one or more embodiments, the circumferential bias assembly comprises a circumferential bias block positioned at least partially between the first extension member of the first hub and the second extension member of the second hub.

According to one or more embodiments, the circumferential bias block comprises a wedge defining a tip oriented outwardly along the radial direction.

According to one or more embodiments, the first extension member and the second extension member each define a sloped surface, and the wedge is positioned between the sloped surfaces of the first and second extension members along the circumferential direction.

According to one or more embodiments, the circumferential bias block comprises a wedge and a hook positioned at least partially between the first extension member of the first hub and the second extension member of the second hub, and the circumferential bias assembly further comprises a retention member positioned at least partially in the channel.

According to one or more embodiments, each of the first hub and the second hub comprises ceramic matrix composite materials.

According to one or more embodiments, a turbine engine defining an axial direction, a radial direction, and a circumferential direction, comprises: a compressor section; a combustion section; and a turbine section, wherein the compressor section or the turbine section comprises an airfoil assembly comprising: a first airfoil defining a first end along the radial direction; a first hub disposed on the first end of the first airfoil and comprising a first extension member extending at least partially in the radial direction; a second airfoil adjacent to the first airfoil, the second airfoil defining a first end along the radial direction; a second hub disposed on the first end of the second airfoil and comprising a second extension member extending at least partially in the radial direction; and a circumferential bias assembly operable with the first extension member, the second extension member, or both for exerting a circumferential force on the first extension member, the second extension member, or both.

According to one or more embodiments, the circumferential bias assembly is a first shroud assembly, and wherein the first shroud assembly comprises a spring member coupled to the first extension member, positioned adjacent to the first extension member, or both.

According to one or more embodiments, the circumferential bias assembly comprises a circumferential bias block positioned at least partially between the first extension member of the first hub and the second extension member of the second hub.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
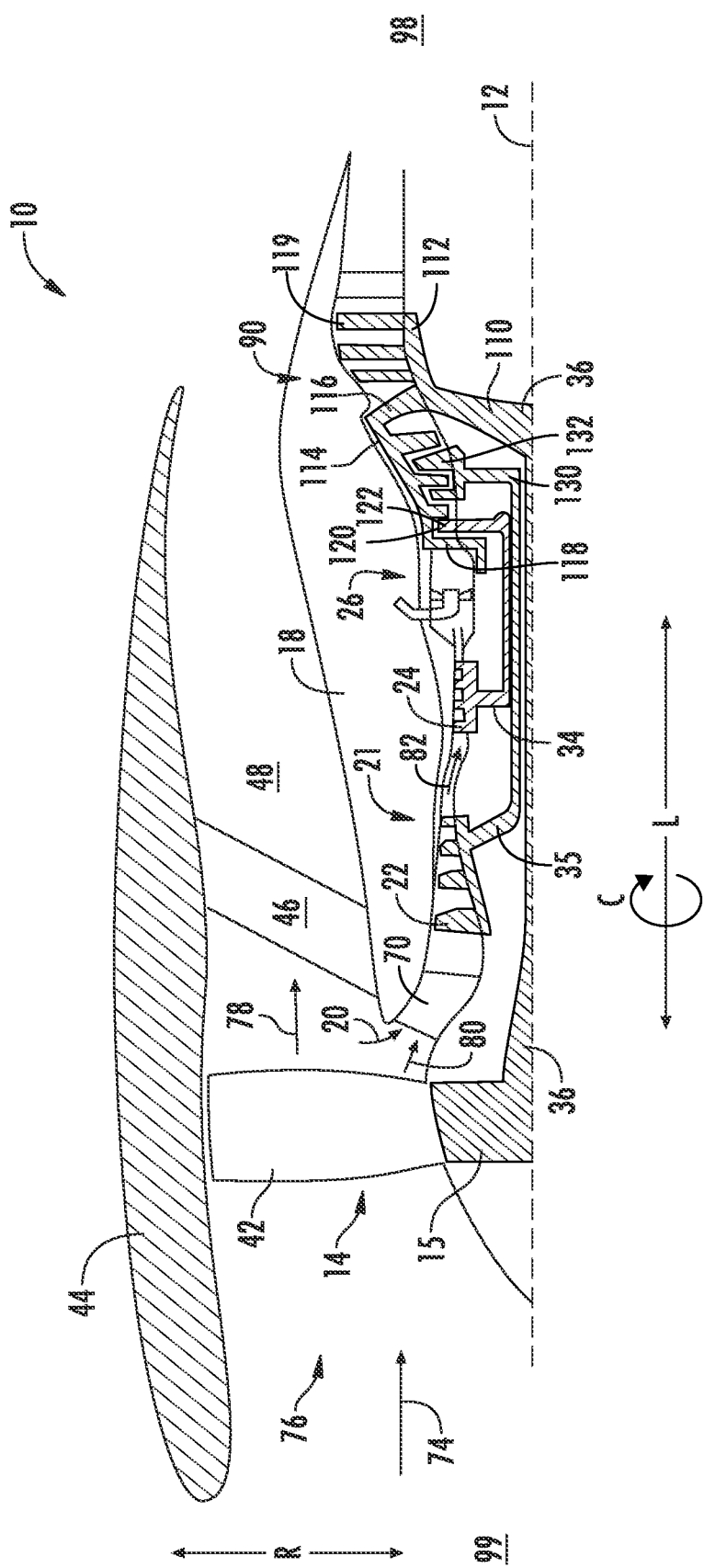
FIG. 1 is a schematic cross-sectional view of a gas turbine engine according to one or more embodiments.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

One example of a gas turbine engine is a vaneless counter-rotating low pressure (LP) turbine engine in which blades that would correspond to conventional stator vane stages rotate in the opposite direction (i.e., counter-rotate) as the rotor blades. The counter-rotating blades are attached to a rotating drum radially outboard the annulus. It is desirable that the counter-rotating blades have a hub shroud at their respective inner ends along a radial direction that remains locked during operation to provide stability to buckling and acceptable aeromechanics. For example, the hub-shrouds may be pre-stressed to act as torsional springs when assembled, exerting circumferential loads on hub-shrouds of adjacent blades to lock the hub-shrouds together.

However, CMC components have significantly higher stiffness than conventional materials such as metal. While forming counter-rotating blades and corresponding hub shrouds of CMC materials may be beneficial, due to the higher stiffness, it may be difficult for pre-stressed CMC hub shrouds to provide sufficient circumferential forces to keep the hub shrouds locked. Therefore, a structure that provides increased circumferential forces to lock the hub shrouds together may be desirable.

Referring now to the drawings, FIG. 1 is a schematic cross-sectional view of an exemplary gas turbine engine 10 (herein referred to as "engine 10"), shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. Still further, although described below as a three-spool gas turbine engine, the present disclosure is also applicable to two-spool gas turbine engines. As shown in FIG. 1, the engine 10 has a longitudinal or axial centerline axis 12 that extends there through for reference purposes. The engine 10 defines a circumferential direction C, a longitudinal direction L, a radial direction R, and an upstream end 99 and a downstream end 98 along the longitudinal direction L. The longitudinal direction L may alternatively be referred herein as "axial direction."

In general, the engine 10 may include a substantially tubular outer casing 18 that defines an annular inlet 20. The outer casing 18 encases or at least partially flows, in serial flow arrangement, a compressor section 21, a combustion section 26, and an interdigitated turbine section 90 (herein referred to as "turbine section 90"). Generally, the engine 10 defines, in serial flow arrangement from the upstream end 99 to the downstream end 98, the fan assembly 14, the compressor section 21, the combustion section 26, and the turbine section 90, that together form a core flowpath 70. In the embodiment shown in FIG. 1, the compressor section 21 defines a high pressure (HP) compressor 24 and an intermediate pressure (IP) compressor 22. In other embodiments, the fan assembly 14 may further include or define one or more stages of a plurality of fan blades 42 that are coupled to and extend outwardly in the radial direction R from a fan rotor 15 and/or a low speed shaft 36. In various embodiments, multiple stages of the plurality of fan blades 42 coupled to the low speed shaft 36 may be referred to as a low pressure (LP) compressor.

An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

The turbine section 90 further includes a high speed turbine rotor 120 and an intermediate speed turbine rotor 130 each disposed forward or upstream 99 of the one or more connecting airfoils 116 of the low speed turbine rotor 110. The high speed turbine rotor 120 includes a plurality of high speed turbine airfoils 122 that extend outward along the radial direction R. The intermediate speed turbine rotor 130 includes a plurality of intermediate speed turbine airfoils 132 that extend outward along the radial direction R. The pluralities of high speed turbine airfoils 122 and intermediate speed turbine airfoils 132 are each disposed among the pluralities of outer shroud airfoils 118 of the low speed turbine rotor 110 along the longitudinal direction L.

During operation of the engine 10, the high speed turbine rotor 120 rotates generally at a higher rotational speed than the intermediate speed turbine rotor 130. The intermediate speed turbine rotor 130 rotates generally at a higher speed than the low speed turbine rotor 110. During operation of the engine 10, a volume of air as indicated schematically by arrows 74 enters the engine 10 through an associated inlet 76 of the nacelle and/or fan assembly 14. As the air 74 passes across the fan blades 42, a portion of the air as indicated schematically by arrows 78 is directed or routed into the bypass airflow passage 48 while another portion of the air as indicated schematically by arrows 80 is directed or through the fan assembly 14. Air 80 is progressively compressed as it flows through the compressor section 21 toward the combustion section 26.

The now compressed air, as indicated schematically by arrows 82, flows into the combustion section 26 where fuel is introduced, mixed with at least a portion of the compressed air 82, and ignited to form combustion gases. The combustion gases flow into the turbine section 90, causing rotary members of the turbine section 90 to rotate and support operation of respectively coupled rotary members in the compressor section 21 and/or fan assembly 14.

Figure 2:
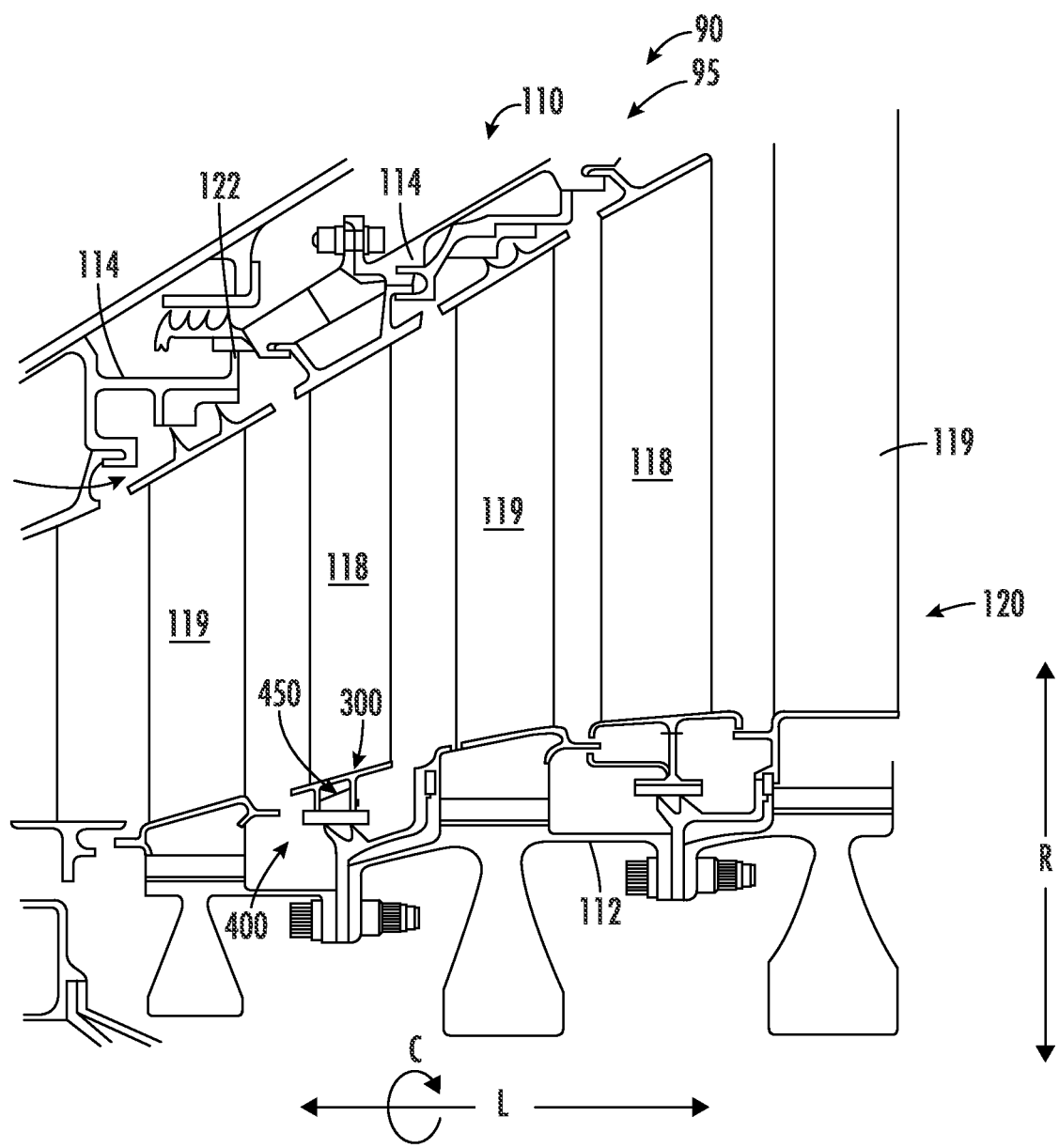
FIG. 2 is a cross-sectional view of a portion of the turbine rotor assembly of the turbine section of the gas turbine engine shown in FIG. 1 according to one or more embodiments.

Referring additionally to FIG. 2, the turbine section 90 includes a turbine rotor assembly 95. The turbine rotor assembly 95 includes a first turbine rotor 110 in alternating arrangement along the longitudinal direction L with a second turbine rotor 120. The first turbine rotor 110 includes an outer rotor 114 surrounding the second turbine rotor 120. A plurality of outer rotor airfoils 118 extend inward along the radial direction R from the outer rotor 114. In various embodiments, the outer rotor 114 defines a drum or disk into which the plurality of outer rotor airfoils 118 are fixed. For example, the plurality of outer rotor airfoils 118 may be fixed to the outer rotor 114 via hangers, slots, dovetails, pins, mechanical fasteners (e.g., bolts, nuts, rivets, tie rods, etc.), or combinations thereof.

The second turbine rotor 120 includes an inner rotor 112. A plurality of inner rotor airfoils 119 extend outward along the radial direction R from the inner rotor 112. The inner rotor 112 may define a drum, disk, bladed disk (e.g., Blisk) or integrally bladed rotor (IBR). The plurality of inner rotor airfoils 119 may be fixed to the inner rotor 112 via hangers, slots, dovetail pins, mechanical fasteners, or combinations thereof. In various embodiments, the inner rotor 112 and inner rotor airfoils 119 may be defined substantially as a single, integral piece.

In one or more embodiments, the turbine rotor assembly 95 generally provided in FIG. 2 defines a counter-rotating low speed turbine rotor assembly. The first turbine rotor 110 and the second turbine rotor 120 may each be coupled to the low speed shaft 36. In one embodiment, the first turbine rotor 110 is coupled to the low speed shaft 36 and the second turbine rotor 120 is coupled to the low speed shaft 36 via a speed reduction assembly. The speed reduction assembly may include a gearbox, a gear assembly, or a hydraulic or pneumatic speed change assembly. The low speed shaft 36 is coupled at an opposing longitudinal end to the fan rotor 15 of the fan assembly 14.

In one or more embodiments, the second turbine rotor 120 is coupled to a high speed shaft 34 that is further coupled at an opposing longitudinal end to the HP compressor 24. In one or more embodiments, the turbine section 90 may further include a third turbine rotor 130 coupled to a low pressure (LP) or intermediate pressure (IP) compressor 22 at an opposing longitudinal end of the engine 10 via a third shaft 35. In one or more embodiments, the turbine rotor assembly 95 described herein may include the first turbine rotor 110 surrounding one or more of the second turbine rotor 120, third turbine rotor 130, or both. In one or more embodiments, the first turbine rotor 110 is in counter-rotating arrangement relative to the second turbine rotor 120, the third turbine rotor 130, or both.

The turbine rotor assembly 95 may generally define an at least partially independently rotatable first turbine rotor 110 relative to the second turbine rotor 120. For example, the first turbine rotor 110 may define a generally fixed or proportional speed relative to the second turbine rotor 120. As another example, the first turbine rotor 110 may be defined independently rotatable relative to the second turbine rotor 120 or third turbine rotor 130, or both.

It will be appreciated, however, that the exemplary gas turbine engine of FIGS. 1 and 2 is provided by way of example only, and that in other exemplary embodiments, the gas turbine engine may have any other suitable configuration. For example, the engine may include any other suitable number or configuration of shafts/spools, compressors, turbines, etc. Further for example, although the exemplary gas turbine engine is depicted as a turbofan engine, in other embodiments, it may be configured as a turboprop, a turbojet, a turboshaft, etc. Further, in still other exemplary embodiments, the gas turbine engine may be incorporated into aeronautical vehicles, or alternatively may be configured for use in aeroderivative vehicles, for land-based power generation, etc.

Figure 3:
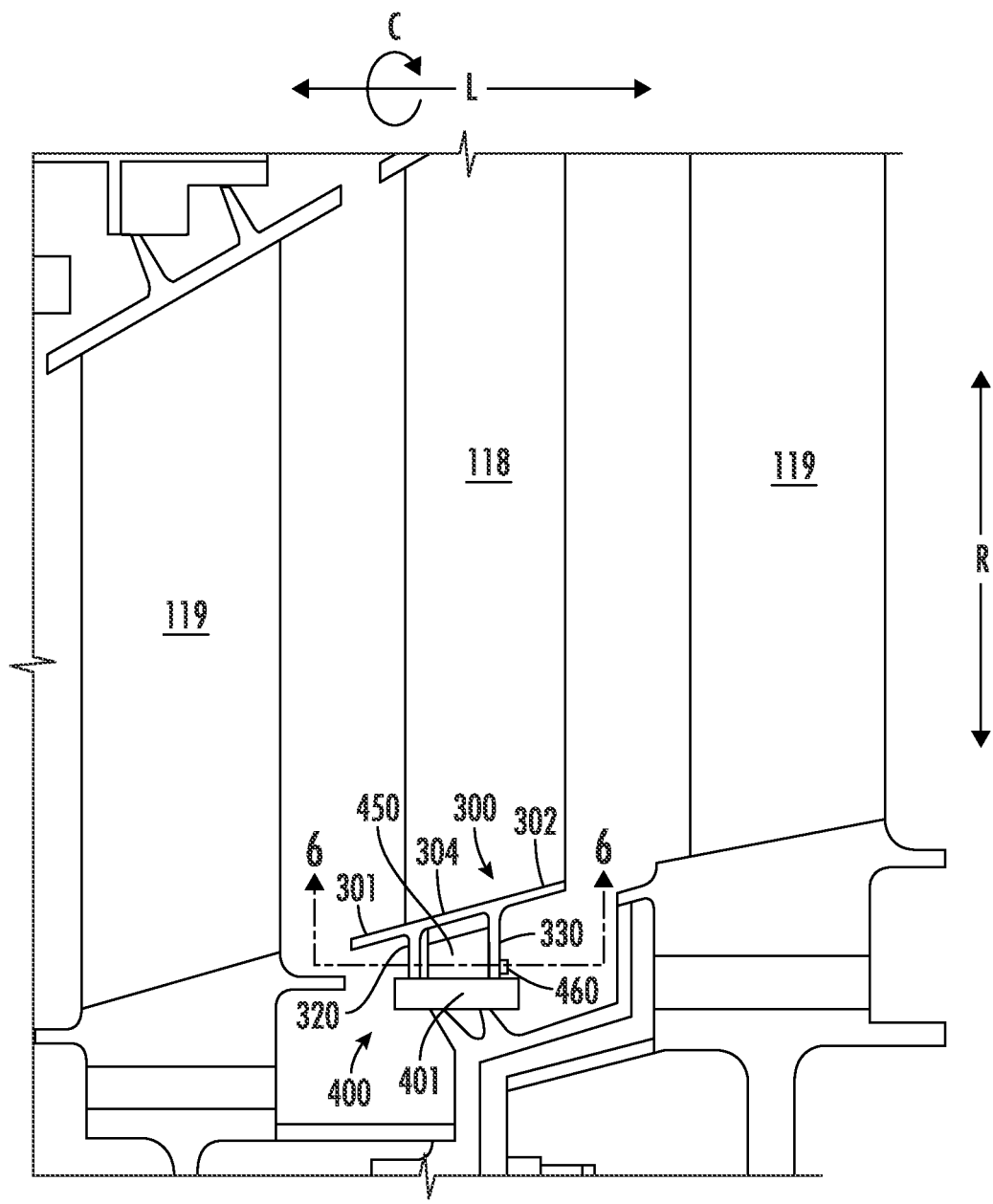
FIG. 3 is a cross-sectional view of a portion of a turbine rotor assembly of the turbine section of the gas turbine engine shown in FIG. 2 according to one or more embodiments.
Figure 4:
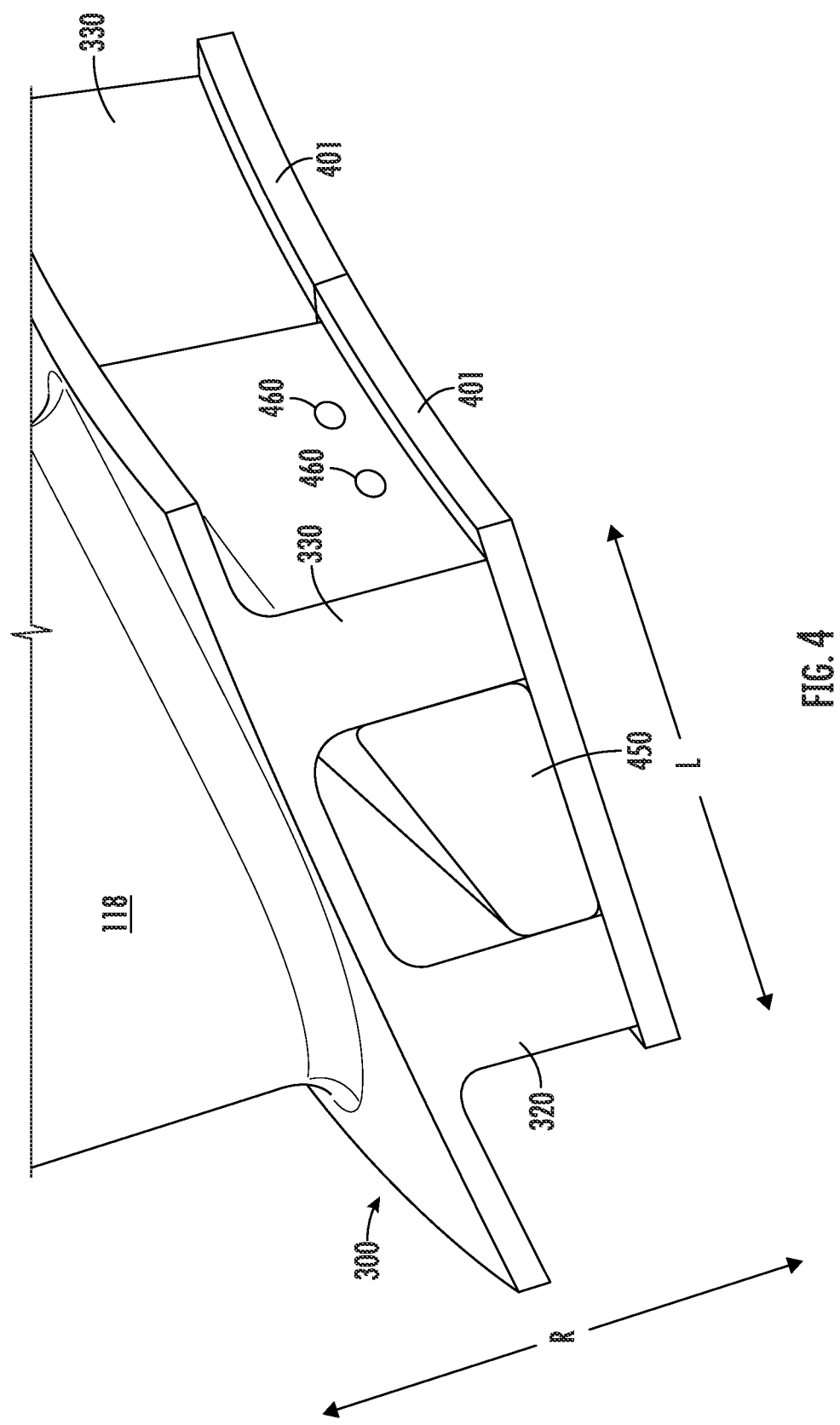
FIG. 4 is a is perspective view of two hubs and hub shroud assemblies after assembly according to one or more embodiments.
Figure 5:
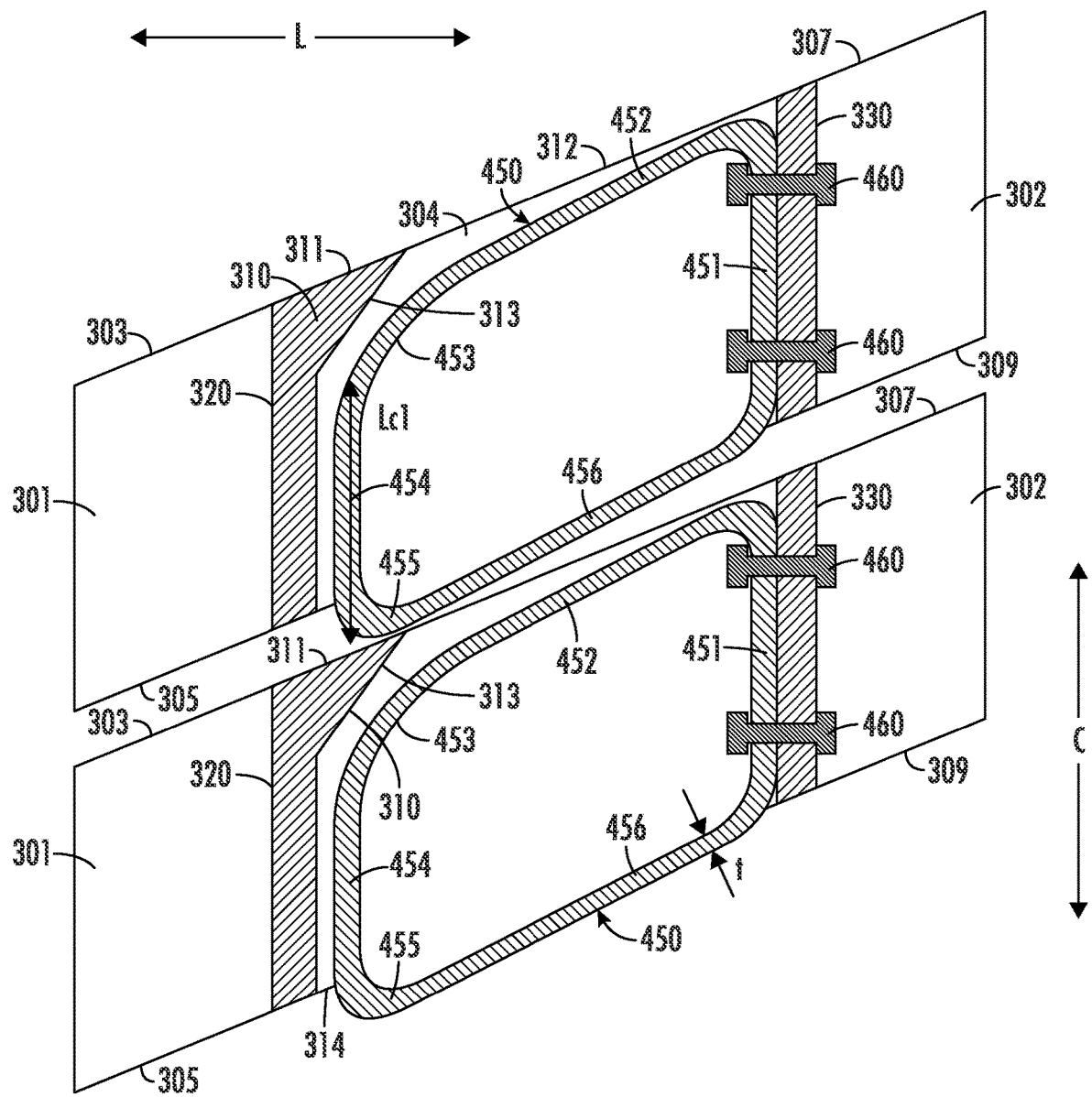
FIG. 5 is a cross-sectional view from a radial direction of two hubs and hub shroud assemblies before assembly according to one or more embodiments.
Figure 6:
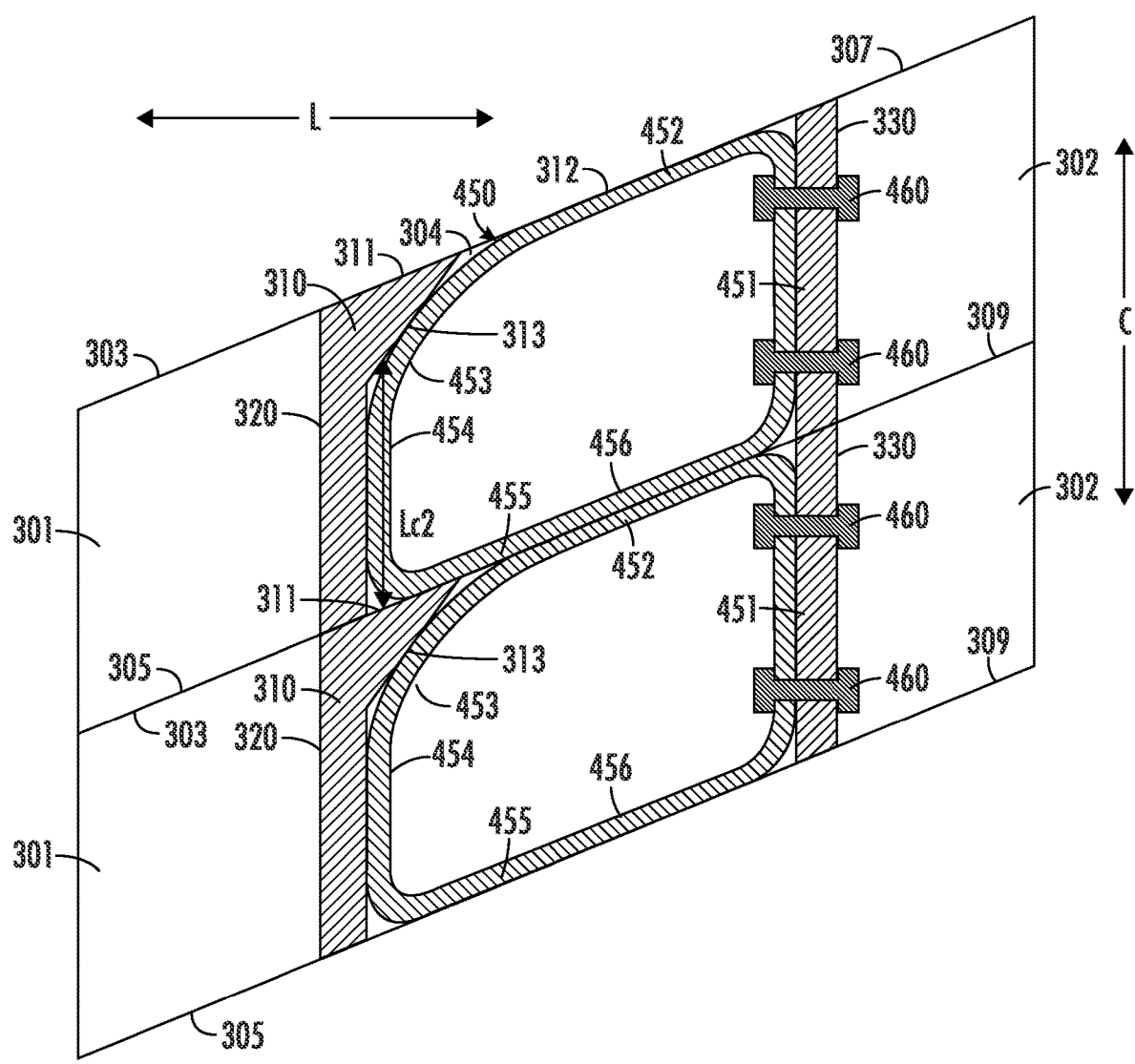
FIG. 6 is a cross-sectional view from a radial direction of two hubs and hub shroud assemblies after assembly according to one or more embodiments.

Reference will now be made to FIGS. 3 through 6, wherein FIG. 3 is a cross-sectional view of a portion of a turbine rotor assembly of the turbine section of the gas turbine engine shown in FIG. 2 according to one or more embodiments, FIG. 4 is a perspective view of two hubs 300 and hub shroud assemblies 400 after assembly according to one or more embodiments, FIG. 5 is a cross-sectional view from a radial direction R of two hubs 300 and hub shroud assemblies 400 before assembly according to one or more embodiments, and FIG. 6 is a cross-sectional view from a radial direction corresponding to line 6-6 in FIG. 3 of two hubs 300 and hub shroud assemblies 400 after assembly according to one or more embodiments.

Referring particularly to FIGS. 3 and 4, as shown the hub 300 is disposed on an inner side of each of the outer rotor airfoils 118 along the radial direction R. That is, each of the outer rotor airfoils 118 extends outward in the radial direction R from an outer surface of the hub 300 along the radial direction R. According to one or more embodiments, the outer rotor airfoils 118 and the corresponding hubs 300 are formed of CMC materials. According to one or more embodiments, the outer rotor airfoils 118 and the corresponding hubs 300 are integrally formed.

According to one or more embodiments, the hub 300 is parallelogram-shaped and includes an upstream hub portion 301, a downstream hub portion 302, and a central hub portion 304. The upstream hub portion 301, the downstream hub portion 302, and the central hub portion 304 together form a hub shroud. According to one or more embodiments, a first radial extension member 320 and a second radial extension member 330 extend inward in the radial direction R from a radial inner surface of the hub 300 with a space formed therebetween. The first and second radial members 320, 330 may extend from one edge of the hub 300 to the other edge of the hub 300 along the circumferential direction C. Each of the hubs 300 are interlocked with adjacent hubs 300, with the hubs 300 extending entirely around the axial centerline axis 12 of the engine 10. According to one or more embodiments, the first and second radial extension members 320, 330 are formed as radial walls. Chamfers may be formed at the bases of the first and second radial extension members 320, 330.

According to one or more embodiments, the upstream hub portion 301 includes a first circumferential edge 303 and a second circumferential edge 305, and the downstream hub portion 302 includes a first circumferential edge 307 and a second circumferential edge 309, as shown in FIG. 5. Additionally, the central hub portion 304 may include a first circumferential edge 312 and a second circumferential edge 314.

According to one or more embodiments, a hub shroud assembly 400 is disposed on each of the hubs 300. The hub shroud assembly 400 includes a sealing element 401 disposed on the innermost edges in the radial direction R of the first and second radial extension members 320, 330. The sealing element 401 may extend further upstream than the first radial extension member 320 and further downstream than the second radial extension member 330. The sealing element 401 may extend from one circumferential edge of the first and second radial extension members 320, 330 to the other. Moreover, as will be appreciated, the sealing element 401 may interact with features of the inner rotor 112, such as teeth of the inner rotor, to prevent relatively high pressure air from traveling around the airfoils 118 from an upstream position to a downstream position.

According to one or more embodiments, the hubs 300 are torsionally pre-stressed such that, when assembled, one circumferential end of the hub 300 exerts a circumferential load on the other circumferential end of the adjacent hub 300. For example, the second circumferential edge 305 of the upstream hub portion 301 of one hub 300 may exert a circumferential load on a first circumferential edge 303 of the upstream hub portion 301 an adjacent hub 300. Additionally, the first circumferential edge 307 of the downstream hub portion 302 may exert a circumferential load on the second circumferential edge 309 of the downstream hub portion 302 of the adjacent hub 300. Because the hubs 300, once assembled, extend entirely around the axial centerline axis 12 of the engine 10, the circumferential loads translate across an entire circumference around the axial centerline axis 12, locking the hubs 300 together in place.

According to one or more embodiments, each of the hubs 300 include an axial wall 310 extending substantially in the axial direction from one of the first and second radial extension members 320, 330. More specifically, referring particularly to FIGS. 5 and 6, the axial wall 310 may extend from one of the first and second radial extension members 320, 330 towards the other of the first and second radial extension members 320, 330. Specifically for the embodiment shown, the axial wall 310 extends in a downstream direction from the first radial extension member 320. According to one or more embodiments, the axial wall 310 may radially extend along the entire radial height of the first or second radial extension members 320, 330. The radial wall 310 may include a first surface 311 and a second surface 313. The first surface 311 may be flush with the first circumferential edge 312 of the central hub portion 304. The second surface 313 may extend from the first radial extension member 320 towards the first circumferential edge 312 of the central hub portion 304. The second surface 313 may form a first acute angle with the first circumferential edge 312 of the central hub portion 304 and may form a second acute angle with the first radial extension member 320.

Alternatively, the axial wall 310 may extend in the upstream direction from the second radial extension member 320. With this structure, the axial wall 310 may extend in the upstream direction from the second radial extension member 330, the first surface 311 may be flush with the second circumferential edge 314 of the central hub portion 304, and the second surface 313 may extend from the second radial extension portion 320 towards the second circumferential edge 314 of the central hub portion 304. The second surface 313 may form a first acute angle with the second circumferential edge 314 of the central hub portion 304 and may form a second acute angle with the second radial extension member 330.

According to one or more embodiments, a spring member 450 is positioned adjacent to and/or coupled to at least one of the first and second radial extension members 320, 330. More specifically, for the embodiment shown, the spring member 450 is disposed in the space between the first and second radial extension members 320, 330. The spring member 450 may be disposed on an outer surface in the radial direction R of the sealing element 401. According to one or more embodiments, the spring member 450 is a sheet metal spring (e.g., sheet metal folded or otherwise formed into the cross-sectional shape depicted in FIG. 5). As shown in FIG. 5, the spring member 450 may have a constant thickness t. The spring member 450 may also be attached to one of the first and second radial extension members 320, 330. For example, as shown in FIGS. 4-5, the spring member 450 is attached to the second radial extension member 330 via a fastener 460. The fastener 460 may be a nut-and-bolt structure. Alternatively, the spring member 450 may be attached to one of the first and second radial extension members 320, 330 by other attachment structures such as welding, brazing, adhesives, or other attachment structures known in the art. According to one or more embodiments, the entire spring member 450 is disposed in the space between the first and second radial extension members 320, 330.

Figure 7:
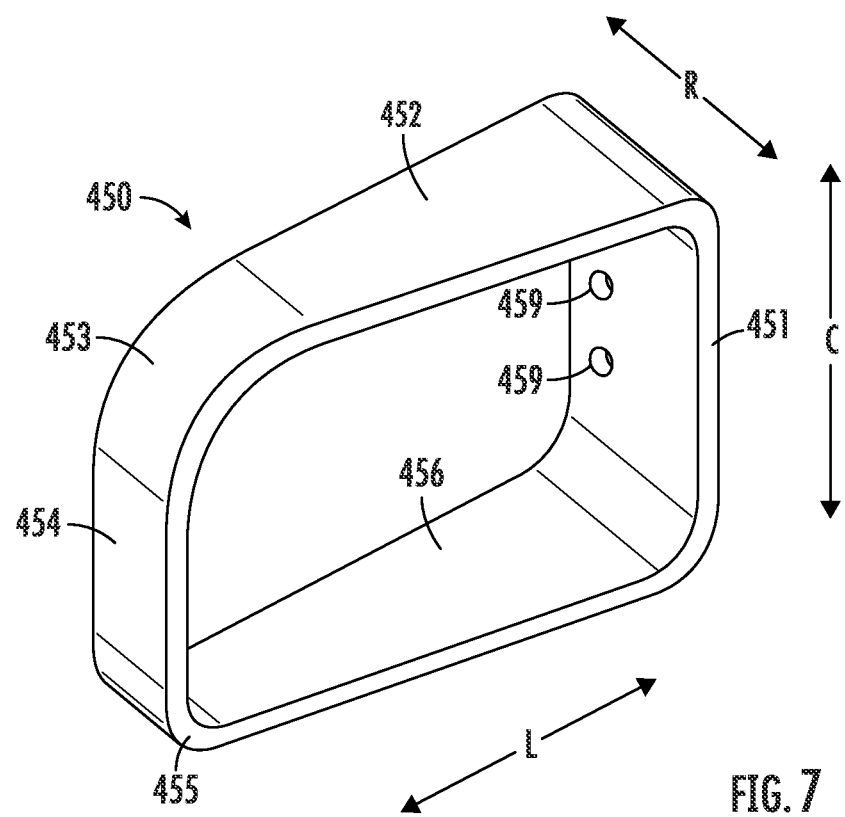
FIG. 7 is a perspective view of a spring member according to one or more embodiments.

According to one or more embodiments, and with further reference to FIG. 7, the spring member 450 includes a first portion 451 that extends substantially in the circumferential direction C, a second portion 452 that extends substantially in the axial direction adjacent to the first portion 451, a third portion 454 that extends substantially in the circumferential direction adjacent to the second portion 452, and a fourth portion 456 that extends substantially in the axial direction adjacent to the third portion 454 and the first portion 451. Corner portions may be disposed between the adjacent first, second, third, and fourth portions 451, 452, 454, 456. The corner portion between the second and third portions 452, 454 may be formed as a first abutting portion 453, and the corner portion between the third and fourth portions 454, 456 may be formed as a second abutting portion 455. According to one or more embodiments, the third portion 454 may be shorter than the first portion 451, and the second portion 452 may be shorter than the fourth portion 456. The first abutting portion 453 may have a curvature with a higher radius of curvature than the second abutting portion 455. In the particular embodiment shown, the first portion includes two openings 459 for insertion of the fasteners 460.

Referring again to the close-up view in FIG. 7 of the exemplary spring member 450, for the embodiment shown, a thickness t of the spring member 450 is substantially constant. However, a height of the spring member 450 along the radial direction is greater on the downstream end than the upstream end.

Figure 8:
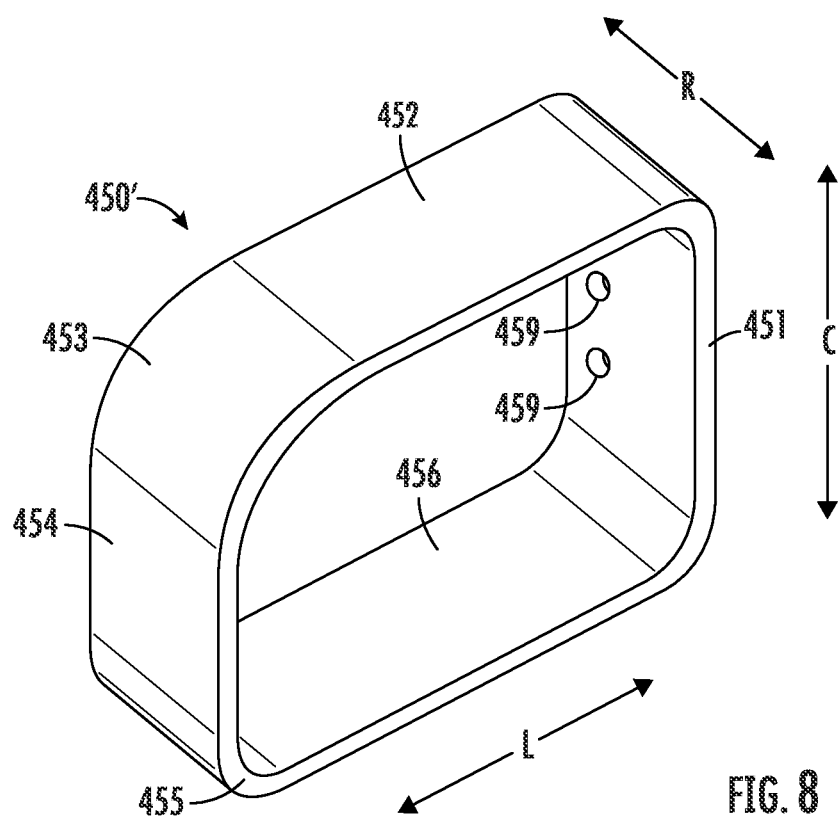
FIG. 8 is a perspective view of a spring member according to one or more embodiments.
Figure 9:
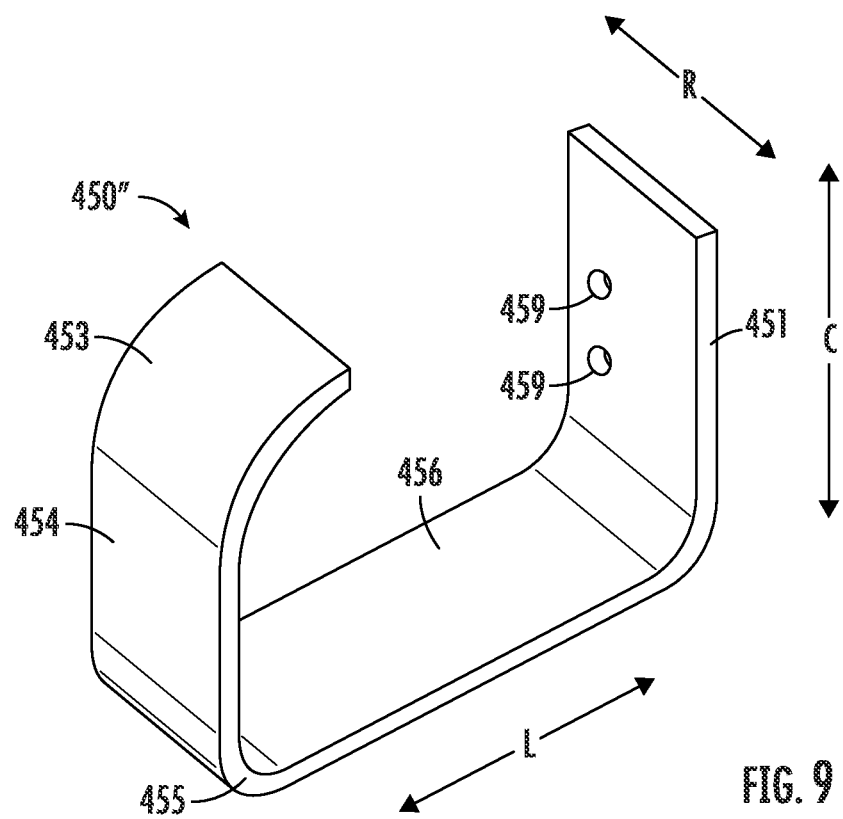
FIG. 9 is a perspective view of a spring member according to one or more embodiments.
Figure 10:
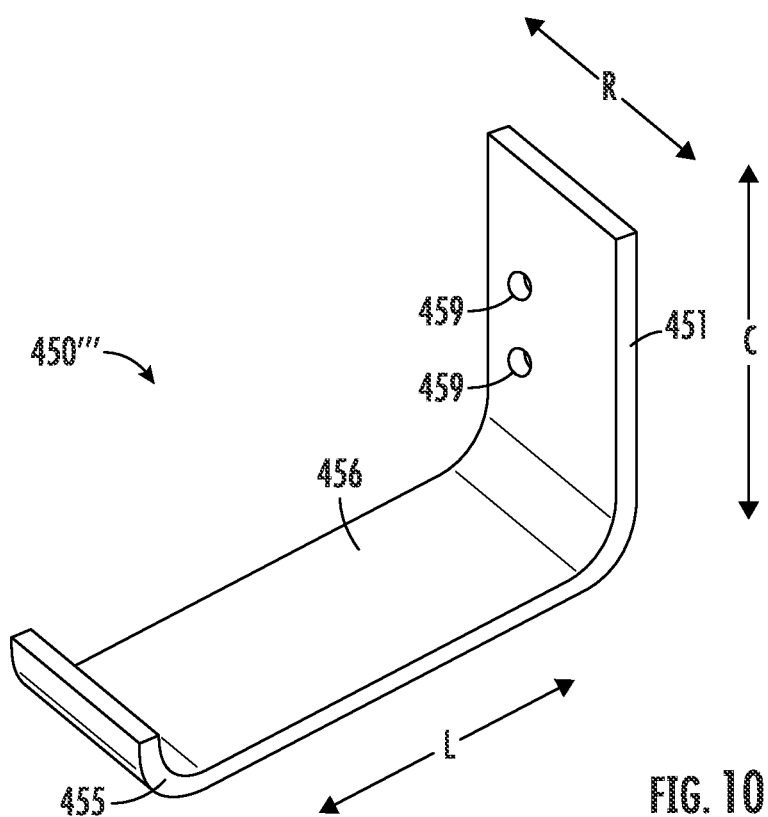
FIG. 10 is a perspective view of a spring member according to one or more embodiments.

Referring now to FIGS. 8 through 10 various alternative exemplary embodiments are depicted of the spring member 450 described above, noted as spring members 450', 450", 450'". The spring members 450', 450", 450'" may be configured in substantially the same manner as the exemplary spring member 450 of FIG. 7 and described above. For example, as with the embodiment of FIG. 7 and described above, a first portion 451 of the spring members 450', 450", 450'" may be attached to a second radial extension member 330.

However, for the embodiments of FIGS. 8 through 10, the spring members 450', 450", 450'" may have substantially equal height along the radial direction R from the upstream end to the downstream end.

Further, in certain exemplary embodiments, such as the exemplary embodiments of FIGS. 9 and 10, the spring members 450", 450'" may not be a complete loop. For example, the embodiment of FIGS. 7 and 8 are complete loops, including the first, second, third, and fourth portions 451, 452, 454, 456, as well as the first and second abutting portions 453, 455. By contrast, however, the spring member 450" of FIG. 9 may omit the second portion 452, such that the spring member 450" is formed of the first, third, and fourth portions 451, 454, 456, and the first and second abutting portions 453, 455, and is U-shaped. Further, for the embodiment of FIG. 10, the spring member 450" may omit the second and third portions 452, 454 and the first abutting portion 453, such that the spring member 450'" is formed of the first and fourth portions 451, 456 and the second abutting portion 455, and is L-shaped.

Referring still to FIGS. 5 and 6, assembly of the hub 300 and the spring member 450 will be explained. FIG. 5 is a cross-sectional view from a radial direction R of two hubs 300 and hub shroud assemblies 400 before assembly according to one or more embodiments, and FIG. 6 is a cross-sectional view from a radial direction of two hubs 300 and hub shroud assemblies 400 after assembly according to one or more embodiments.

As already explained above, the hubs 300 may be torsionally pre-stressed prior to assembly, such that when the hubs 300 are assembled as shown in FIG. 6, the torsional stress of each hub exerts circumferential loads on the adjacent hub 300, locking the assembled hubs 300 together. However, the torsionally pre-stressed hubs 300 may not be sufficient to lock the hubs 300 together. For example, if the hubs 300 are formed of CMC, due to the increased stiffness, the torisional pre-stress may not be sufficient to provide the circumferential displacement to lock the hubs 300 together during operation.

Therefore, according to one or more embodiments, the spring member 450 is disposed in the space between the first and second radial extension members 320, 330. As shown in FIG. 5, prior to assembly, the spring member 450 extends past the second circumferential edge 314 of the central hub portion 304. However, as the hubs 300 are assembled together, the first surface 311 of the axial wall 310 abuts against the second abutting portion 455 and pushes the second abutting portion 455 towards the first circumferential edge 312 of the central hub portion 304 until the spring member 450 is entirely in the space between the first and second radial extension members 320, 330, and the first circumferential edges 303, 314, 307 of the upstream, central, and downstream hub portions 301, 304, 302 of each hub 300 is flush, or nearly flush, with the second circumferential edges 305, 314, 309 of the upstream, central, and downstream hub portions 301, 304, 302, of the adjacent hub 300. As the first surface 311 of the axial wall 310 pushes the second abutting portion 455 towards the first circumferential edge 312 of the central hub portion 304, the first abutting portion 453 abuts the second surface 313 of the axial wall 310. Thus, the second surface 313 of the axial wall 310 of each hub 300 and the first surface 311 of the axial wall 310 of the adjacent hub 300 exert opposite circumferential forces on the spring member 450 to compress the spring member 450. In turn, the compressed spring member 450 exerts a circumferential load on the first surface 311 of the axial wall 310 of the adjacent hub 300, locking the assembled hubs 300 together, as shown in FIG. 6.

According to one or more embodiments, when the spring member 450 is compressed as detailed above, the circumferential length of the spring member 450 at the third portion 454 may be reduced from a first circumferential length Lc1 prior to assembly as shown in FIG. 5 to a second circumferential length Lc2 after assembly as shown in FIG. 6.

The loop-shaped spring members 450, 450' shown in FIGS. 7-8 may exert the largest circumferential loads. However, in some applications, less circumferential loads may be sufficient to lock the hubs 300 together. In such cases, the U-shaped spring member 450" or the L-shaped spring member 450'" may be employed. Additionally, the spring member may be other types of springs that directly or indirectly create a circumferential load on the adjacent hub 300.

It is generally beneficial for counter-rotating outer rotor airfoils 118 to have a hub shroud that remains locked relative to adjacent hub shrouds during operation to provide stability to buckling and acceptable aeromechanics. According to one or more embodiments, a spring element 450 is disposed in the hub 300, which itself may be pre-stressed to act as a torsional spring, to create the necessary interference force to lock the hubs 300 together, such that hub shrouds that are locked together during operation may be achieved. According to one or more embodiments, the hub is formed of CMC and the spring element 450 is formed of sheet metal, such that the spring element 450 is significantly softer than the hub 300, allowing for more displacement for a given force. Such a structure may be able to maintain the hub shrouds in the locked condition over a wide range of operating conditions with the deflections and inherent dimensional variation of the hardware.

Figure 11:
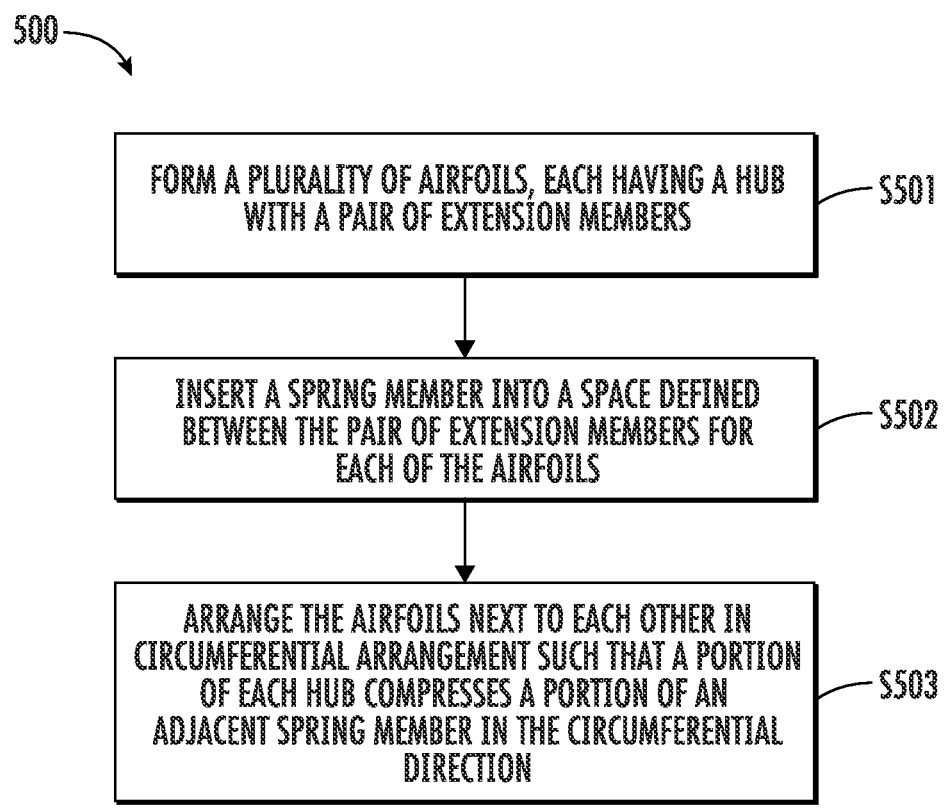
FIG. 11 shows a flow diagram of a method of assembling an airfoil assembly for a turbine engine according to one or more embodiments.

Referring now to FIG. 11, a flow diagram of a method 500 of assembling an airfoil assembly for a turbine engine according to one or more embodiments are shown. The method 500 includes a step S501 of forming a plurality of airfoils 118, each of which has a hub 300 with a pair of extension members 320, 330. According to one or more embodiments, the pair of extension members 320, 330 may be first and second radial extension members 320, 330 formed as radial walls. Different embodiments of the airfoils 118, the hubs 300, and the extension members 320, 330 that may be formed are set forth above.

The method 500 further includes a step S502 of inserting a spring member 450, 450', 450", 450'" into a space defined between the pair of extension members 320, 330 for each of the airfoils 118. Different embodiments of the spring member 450, 450', 450", 450'" are set forth above.

The method 500 further includes a step S503 of arranging the airfoils 118 next to each other in circumferential arrangement such that a portion of each hub 300 compresses a portion of an adjacent spring member 450, 450', 450", 450'" in the circumferential direction. The compressed spring member 450, 450', 450", 450'" exerts a circumferential load onto the portion of the adjacent hub 300 to lock adjacent airfoils 118 together.

Figure 12:
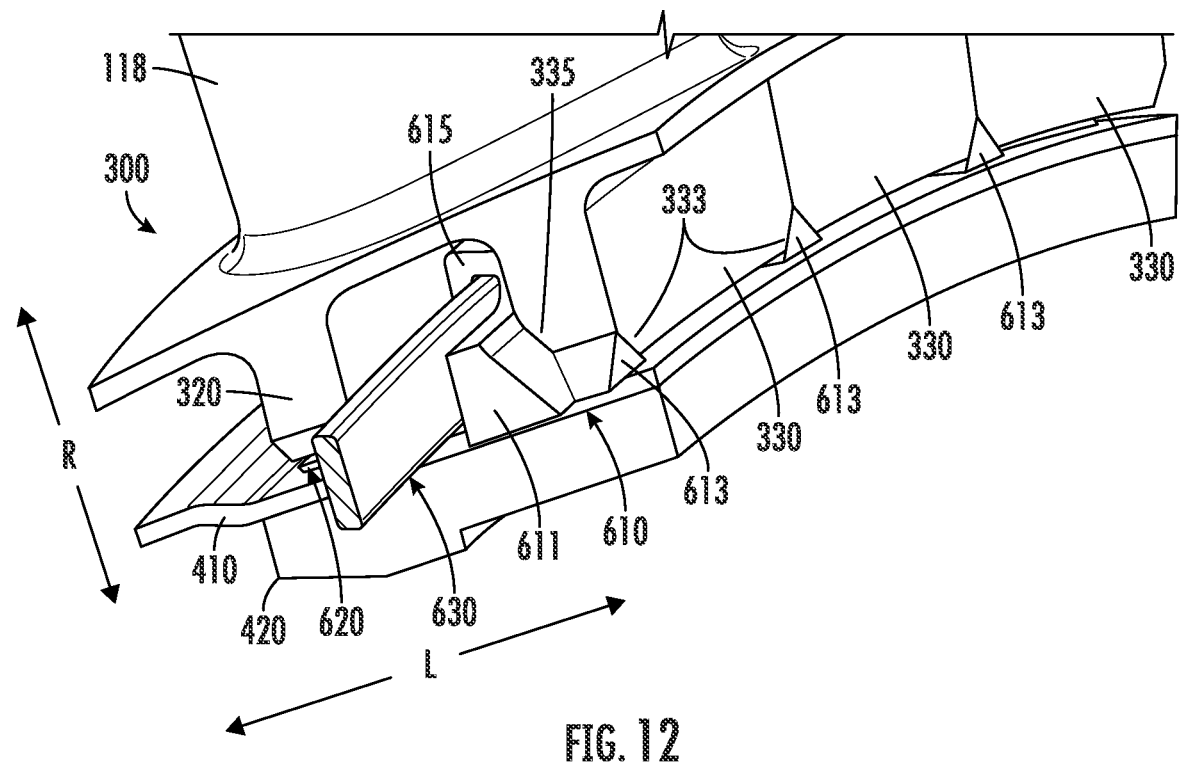
FIG. 12 is a is an aft perspective view of three hubs and a hub shroud assembly after assembly according to one or more embodiments.
Figure 13:
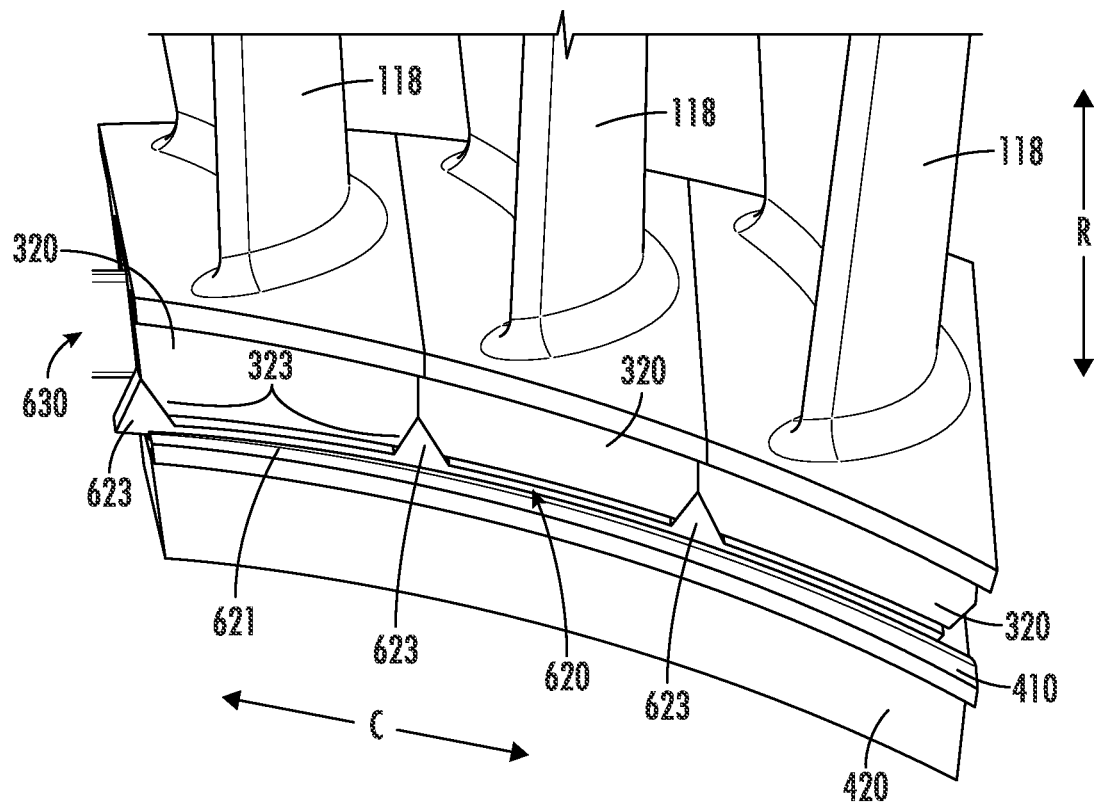
FIG. 13 is a is a front perspective view of three hubs and hub shroud assembly after assembly according to one or more embodiments.
Figure 14:
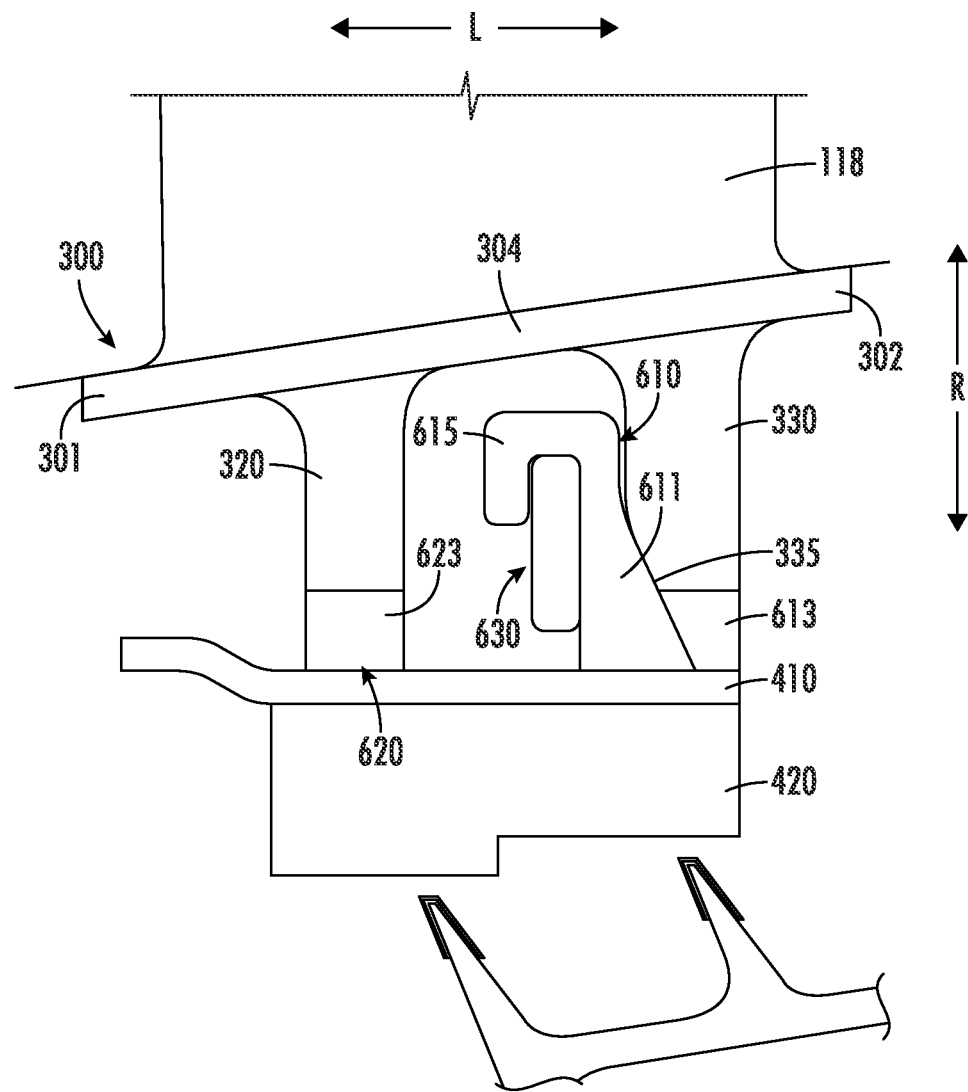
FIG. 14 is a is cross-sectional view of a hub and a hub shroud assembly after assembly according to one or more embodiments.
Figure 15:
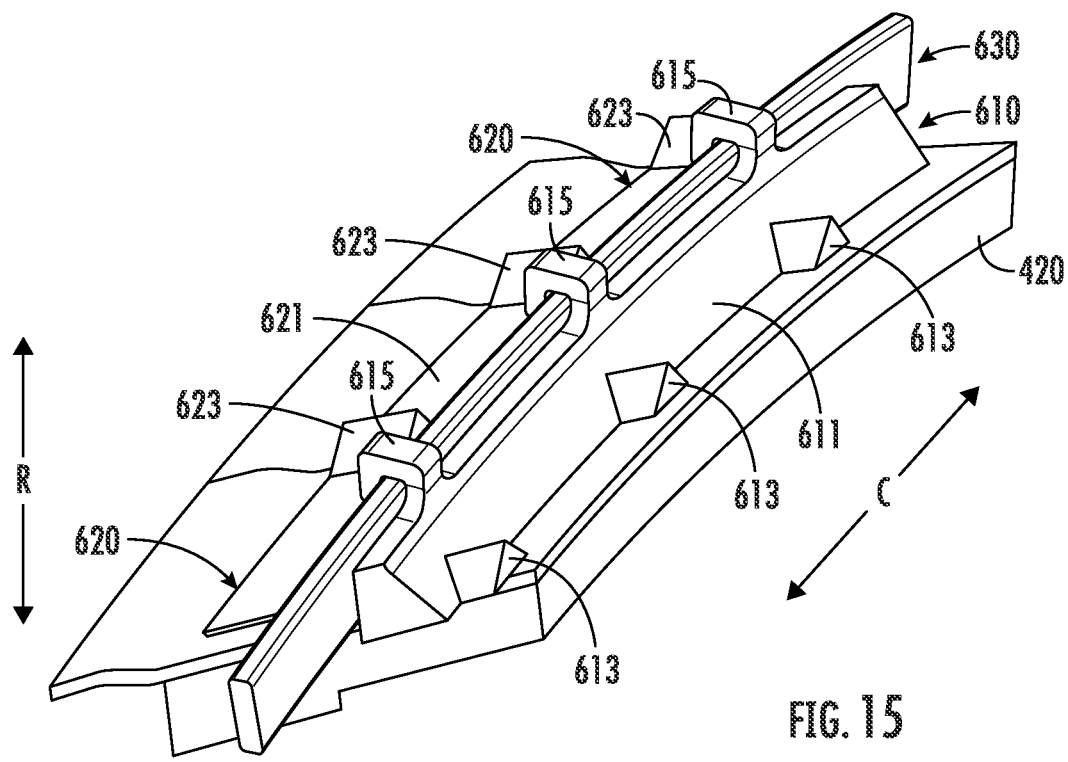
FIG. 15 is a is an aft perspective view of a hub shroud assembly with the hubs removed according to one or more embodiments.
Figure 16:
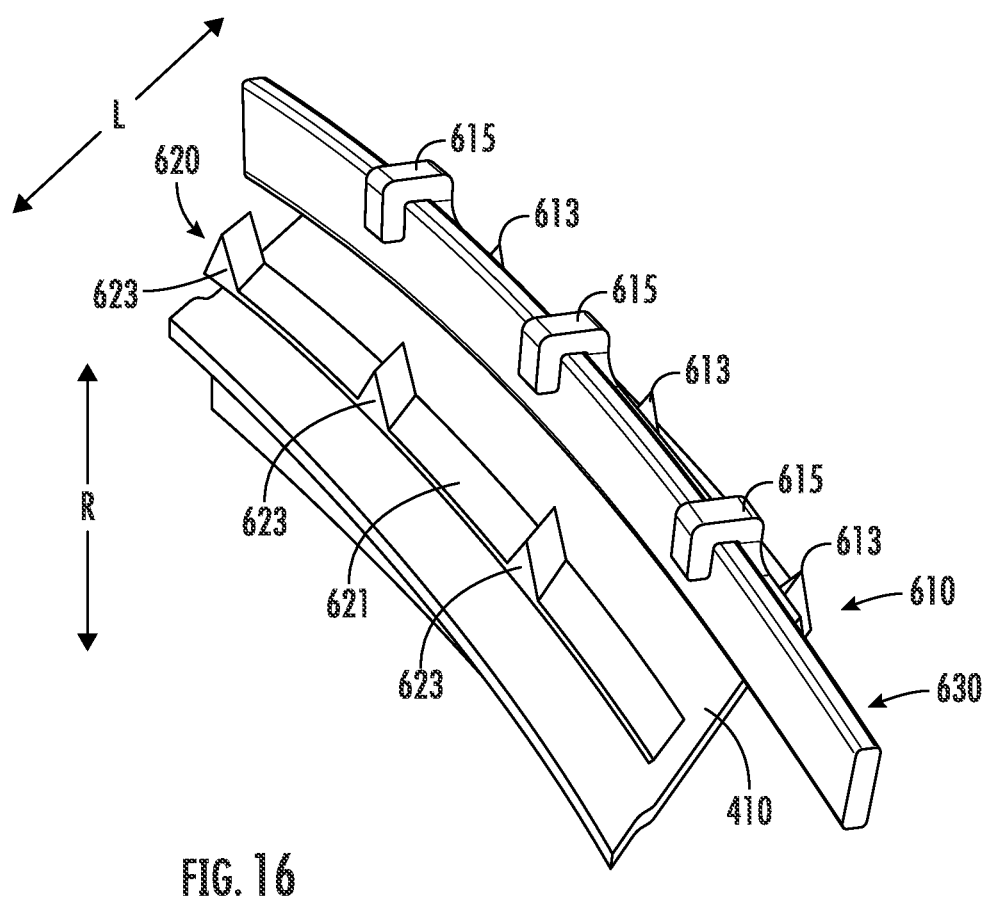
FIG. 16 is a is a front perspective view of a hub shroud assembly with the hubs removed according to one or more embodiments.

FIG. 12 is an aft perspective view, and FIG. 13 is a front perspective view, of three hubs 300 and a hub shroud assembly after assembly according to one or more embodiments. FIG. 14 is a is cross-sectional view of a hub 300 and a hub shroud assembly after assembly according to one or more embodiments. FIG. 15 is a is an aft perspective view, and FIG. 16 is a front perspective view, of a hub shroud assembly with the hubs 300 removed according to one or more embodiments.

The hubs 300 in FIGS. 12-14 are similar to that described above with respect to FIGS. 4-6. For example, each of the hubs 300 depicted in FIGS. 12-14 include a first radial extension member 320 and a second radial extension member 330, each extending inward in a radial direction R from an inner surface of the hub 300 along the radial direction R, with a space formed therebetween.

However, for the embodiment of FIGS. 12-14, the first extension member 320 of each of the hubs 300 includes sloped portions 323 at circumferential ends thereof (see particularly FIG. 13). Each of the sloped portions 323 is sloped when viewed in the longitudinal direction L so as to form an acute angle with a plane defined by the radial direction R and the longitudinal direction L.

Furthermore, the extension member 330 of each of the hubs 300 includes sloped portions 333 at circumferential ends thereof (see particularly FIG. 12). Each of the sloped portions 333 is sloped when viewed in the longitudinal direction L so as to form an acute angle with the plane defined by the radial direction R and the longitudinal direction L. The extension member 330 of each of the hubs 300 may further include another sloped portion 335 at a forward longitudinal end of the extension member 330 (facing the space formed between the first and second radial extension members 320, 330). Each of the sloped portions 335 is sloped when viewed in the circumferential direction C so as to form an acute angle with a plane defined by the radial direction and the circumferential direction C.

Each of the hubs 300 is disposed on an outer surface (along the radial direction R) of an inter-stage seal 410. According to one or more embodiments, the inter-stage seal 410 is an annular structure disposed on an outer surface along the radial direction R of a seal 420. In one or more embodiments, the inter-stage seal 410 may be formed as segments that together forms an annular structure. The seal 420 may be a honeycomb seal for forming an airflow seal with one or more teeth that rotate relative to the seal 420. Alternatively, the seal 420 may be any other suitable structure. The seal 420 may be attached to the inter-stage seal 410 in any suitable manner (e.g., welding) or may be formed integrally with the inter-stage seal 410.

The hub shroud assembly includes a first wedge structure 610 (see particularly FIG. 12) and a second wedge structure 620 (see particularly FIG. 13) attached to an inter-stage seal 410. The first and second wedge structures 610, 620 may be attached to, or formed integrally with, the outer surface of the inter-stage seal 410. For example, the first and second wedge structures 610, 620 may be brazed to the inter-stage seal 410. The first wedge structure 610 is disposed aft of the second wedge structure 620 in the embodiment shown. The first wedge structure 610 and the second wedge structure 620, along with inter-stage seal 410, may span multiple blades as shown in the drawings. Alternatively, each blade may have a separate first wedge structure 610 and second wedge structure 620.

Referring particularly to FIGS. 12 and 14, and also to FIG. 15, the first wedge structure 610 includes a first main body 611 and wedges 613 extending aftward in the longitudinal direction L from an aft surface of the first main body 611. Each of the wedges 613 defines a tip oriented outwardly along the radial direction R. The exemplary wedges 613 depicted are triangular when viewed in the longitudinal direction L. The first wedge structure 610 further includes hooks 615 extending from an outer surface of the first main body 611 in the radial direction R. The hooks 615 are U-shaped, opening inward in the radial direction R.

The aft surface of the first main body 611 may be sloped so as to abut and be flush with the sloped portions 335 of the extension member 330. This slope may aid positioning and alignment of the hubs 300 with the inter-stage seal 410. As shown in FIG. 12, according to one or more embodiments, sloped aft surface of the first main body 611 may span two segments of the inter-stage seal 410.

The radial outer surfaces of the wedges 613 abut the sloped portions 333 at circumferential ends of the extension member 330. The radial outer surfaces of the wedges 613 may be flush with be the sloped portions 333 when the gas turbine engine 10 is not running. Additionally, the wedges 613 may have a larger radial dimension than the sloped portions 333.

The retention structure 630 may be an annular retention ring that is formed as a single annular ring with a split or formed as sections that together form an annular ring. According to one or more embodiments, the retention structure 630 is inserted into the inward-facing hooks 615 of the first wedge structure 610, and the inward-facing hooks 615 hook onto the retention structure 630. According to one or more embodiments, at least a part of the radial outer surface and both longitudinal surfaces of the retention structure 630 are in contact with the hook 615. The retention structure 630 may be held within the hooks 615 such that there is a gap between the retention structure 630 and the inter-stage seal 410. The retention structure 630 may aid retention of each inter-stage seal 410 while the gas turbine engine 10 is not running.

Referring now particularly to FIGS. 13-14, and also to FIG. 16, the second wedge structure 620 includes a second main body 621 and wedges 623 extending outward in the radial direction R from an outer surface of the second main body 621. Each of the wedges 623 defines a tip oriented outwardly along the radial direction R. The exemplary wedges 623 depicted are triangular when viewed in the longitudinal direction L. According to one or more embodiments, the wedges 613 of the first wedge structure 610 are aligned in the longitudinal direction with the wedges 623 of the second wedge structure.

The radial outer surfaces of the wedges 623 abut the sloped portions 323 at circumferential ends of the extension member 320. The radial outer surfaces of the wedges 623 may be flush with be the sloped portions 323 when the gas turbine engine 10 is not running. Additionally, the wedges 623 may have a larger radial dimension than the sloped portions 323.

During operation of the gas turbine engine 10, as the outer rotor airfoils 118 rotate in the circumferential direction C, the inter-stage seal 410 exerts a centrifugal force outward in the radial direction R on the first and second wedge structures 610, 620. This centrifugal force pushes the wedges 613, 623 into the sloped portions 333, 323 of the extension members 330, 320. According to one or more embodiments, the wedges 613, 623 may be compressed in the radial direction R which in turn expands the wedges 613, 623 in the circumferential directions, pressing against the sloped portions 333, 323. That is, the wedges 613, 623 exert circumferential forces on the corresponding sloped portions 333, 323 to press each of the extension members 330, 320 towards adjacent extension members 330, 320, which locks the extension members 330, 320 and their corresponding hubs 300 together in the circumferential direction C.

Figure 17:
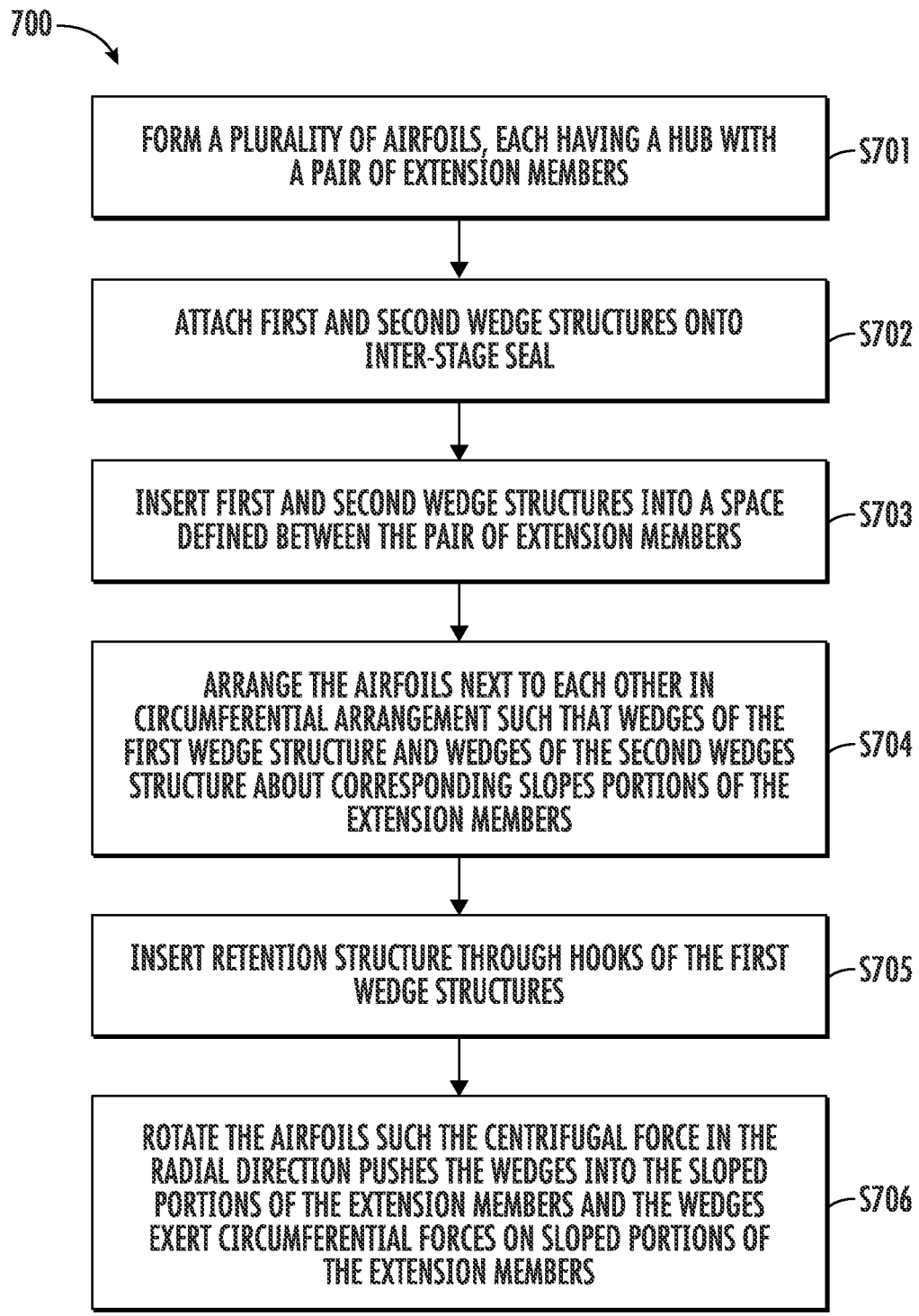
FIG. 17 shows a flow diagram of a method of assembling an airfoil assembly for a turbine engine according to one or more embodiments.

FIG. 17 shows a flow diagram of a method 700 of assembling an airfoil assembly for a turbine engine according to one or more embodiments. The method 700 includes a step S701 of forming a plurality of airfoils 118, each of which has a hub 300 with a pair of extension members 320, 330. According to one or more embodiments, the pair of extension members 320, 330 may be first and second radial extension members 320, 330 formed as radial walls. Different embodiments of the airfoils 118, the hubs 300, and the extension members 320, 330 that may be formed are set forth above.

The method 700 further includes a step S702 of attaching the first and second wedge structures 610, 620 onto an outer surface of an inter-stage seal 410. For example, the first and second wedge structures 610, 620 may be brazed to the inter-stage seal 410. Alternatively, the first and second wedge structures 610, 620 may be formed integrally with the outer surface of the inter-stage seal 410.

The method 700 further includes a step S703 of inserting first and second wedge structures 610, 620 into a space defined between the pair of extension members 320, 330 for each of the airfoils 118. Details of the first and second wedge structures 610, 620 and the retention structure 630 are set forth above.

The method 700 further includes a step S704 of arranging the airfoils 118 next to each other in circumferential arrangement such that wedges 613, 623 of the first and second wedge structures 610, 620 abut corresponding sloped portions 333, 323 of the extension members 330, 320.

The method 700 further includes a step S705 of inserting a retention structure 630 through hooks 615 of the first wedge structures 610. Once inserted, the retention structure 630 is held by the hooks 615.

The method 700 further includes a step S706 of rotating the airfoils 118 such that centrifugal force in the radial direction R pushes the wedges 613, 623 into the sloped portions 333, 323 of the extension members 330, 320, which in turn exert circumferential forces on the sloped portions 333, 323 of the extension members 330, 320.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An airfoil assembly for a turbine engine defining an axial direction, a radial direction, and a circumferential direction, the airfoil assembly comprising: a first airfoil defining a first end along the radial direction; a first hub disposed on the first end of the first airfoil and comprising a first extension member extending at least partially in the radial direction; a second airfoil adjacent to the first airfoil, the second airfoil defining a first end along the radial direction; a second hub disposed on the first end of the second airfoil and comprising a second extension member extending at least partially in the radial direction; and a circumferential bias assembly operable with the first extension member, the second extension member, or both for exerting a circumferential force on the first extension member, the second extension member, or both.

The airfoil assembly of one or more of these clauses, wherein the circumferential bias assembly is a first shroud assembly, and wherein the first shroud assembly comprises a first spring member coupled to the first extension member, positioned adjacent to the first extension member, or both.

The airfoil assembly of one or more of these clauses, further comprising: a second circumferential bias assembly configured as a second shroud assembly, wherein the second shroud assembly comprises a second spring member coupled to the second extension member, positioned adjacent to the second extension member, or both, and wherein the first spring member is configured to exert a circumferential load against the second hub.

The airfoil assembly of one or more of these clauses, wherein the first hub and the second hub are torsional springs, and wherein the first hub exerts a torsional force on the second hub.

The airfoil assembly of one or more of these clauses, further comprising: a plurality of adjacent airfoils in addition to the first and second airfoils, wherein the plurality of adjacent airfoils comprises a third airfoil at one end of the plurality of adjacent airfoils and a fourth airfoil at the other end of the plurality of adjacent airfoils, wherein the third airfoil is adjacent to the second airfoil and a second spring member of the second airfoil exerts a circumferential load on a third hub disposed on the third airfoil, and wherein the fourth airfoil is adjacent to the first airfoil and a fourth spring member of the fourth airfoil exerts a circumferential load on the first hub.

The airfoil assembly of one or more of these clauses, wherein the first extension member is part of a first pair of extension members spaced apart in the axial direction to define a first space therebetween, and wherein the first shroud assembly is disposed in the first space between the first pair of extension members.

The airfoil assembly of one or more of these clauses, further comprising: a second airfoil adjacent to the first airfoil, the second airfoil defining a first end along the radial direction; a second hub disposed on the first end of the second airfoil and comprising a second pair of extension members extending at least partially in the radial direction, the second pair of extension members being spaced apart in the axial direction to define a second space therebetween; and a second circumferential bias assembly configured as a second shroud assembly, wherein the second shroud assembly comprises a second spring member disposed in the second space between the second pair of extension members, and wherein the first spring member is configured to exert a circumferential load against the second hub.

The airfoil assembly of one or more of these clauses, wherein the second hub comprises an axial wall extending in the axial direction from one of the second pair of extension members, and wherein the first spring member exerts the circumferential load on the second axial wall.

The airfoil assembly of one or more of these clauses, wherein the second spring member is attached to the other of the second pair of extension members.

The airfoil assembly of one or more of these clauses, wherein the first shroud assembly further comprises a sealing element coupled to or formed with the first spring member.

The airfoil assembly of one or more of these clauses, wherein the first spring member is a sheet metal spring.

The airfoil assembly of one or more of these clauses, wherein the first end of the first airfoil on which the first hub is disposed is an inner end along the radial direction.

The airfoil assembly of one or more of these clauses, wherein the circumferential bias assembly comprises a circumferential bias block positioned at least partially between the first extension member of the first hub and the second extension member of the second hub.

The airfoil assembly of one or more of these clauses, wherein the circumferential bias block comprises a wedge defining a tip oriented outwardly along the radial direction.

The airfoil assembly of one or more of these clauses, wherein the first extension member and the second extension member each define a sloped surface, and wherein the wedge is positioned between the sloped surfaces of the first and second extension members along the circumferential direction.

The airfoil assembly of one or more of these clauses, wherein the circumferential bias block comprises a wedge and a hook positioned at least partially between the first extension member of the first hub and the second extension member of the second hub, and wherein the circumferential bias assembly further comprises a retention member positioned at least partially in the channel.

The airfoil assembly of one or more of these clauses, wherein each of the first hub and the second hub comprises ceramic matrix composite materials.

A turbine engine defining an axial direction, a radial direction, and a circumferential direction, comprising: a compressor section; a combustion section; and a turbine section, wherein the compressor section or the turbine section comprises an airfoil assembly comprising: a first airfoil defining a first end along the radial direction; a first hub disposed on the first end of the first airfoil and comprising a first extension member extending at least partially in the radial direction; a second airfoil adjacent to the first airfoil, the second airfoil defining a first end along the radial direction; a second hub disposed on the first end of the second airfoil and comprising a second extension member extending at least partially in the radial direction; and a circumferential bias assembly operable with the first extension member, the second extension member, or both for exerting a circumferential force on the first extension member, the second extension member, or both.

The turbine engine of one or more of these clauses, wherein the circumferential bias assembly is a first shroud assembly, and wherein the first shroud assembly comprises a spring member coupled to the first extension member, positioned adjacent to the first extension member, or both.

The turbine engine of one or more of these clauses, wherein the circumferential bias assembly comprises a circumferential bias block positioned at least partially between the first extension member of the first hub and the second extension member of the second hub.

What is claimed is:

1. An airfoil assembly for a turbine engine defining an axial direction, a radial direction, and a circumferential direction, the airfoil assembly comprising:

a first airfoil defining a first end along the radial direction;
a first hub disposed on the first end of the first airfoil and comprising a first extension member extending at least partially in the radial direction;
a second airfoil adjacent to the first airfoil, the second airfoil defining a first end along the radial direction;
a second hub disposed on the first end of the second airfoil and comprising a second extension member extending at least partially in the radial direction; and
a circumferential bias assembly operable with the first extension member and the second extension member for exerting a circumferential force on at least one of the first extension member or the second extension member,
wherein the circumferential bias assembly is a first shroud assembly,
wherein the first shroud assembly comprises a first spring member coupled to the first extension member, positioned adjacent to the first extension member, or both,
wherein the first extension member is part of a first pair of extension members spaced apart in the axial direction to define a first space therebetween, and
wherein the first shroud assembly is disposed in the first space between the first pair of extension members.

2. The airfoil assembly according to claim 1, wherein the second hub comprises a second pair of extension members extending at least partially in the radial direction, the second pair of extension members being spaced apart in the axial direction to define a second space therebetween; and
a second circumferential bias assembly configured as a second shroud assembly,
wherein the second shroud assembly comprises a second spring member disposed in the second space between the second pair of extension members, and
wherein the first spring member is configured to exert a circumferential load against the second hub.

3. The airfoil assembly according to claim 2,
wherein the second hub comprises an axial wall extending in the axial direction from one of the second pair of extension members, and
wherein the first spring member exerts the circumferential load on the axial wall.

4. The airfoil assembly according to claim 3,
wherein the second spring member is attached to the other of the second pair of extension members.

5. The airfoil assembly according to claim 1, wherein the first spring member is a sheet metal spring.

6. The airfoil assembly according to claim 1, wherein the first end of the first airfoil on which the first hub is disposed is an inner end along the radial direction.

7. The airfoil assembly according to claim 1,
wherein the circumferential bias assembly comprises a circumferential bias block positioned at least partially between the first extension member of the first hub and the second extension member of the second hub.

8. The airfoil assembly according to claim 7, wherein the circumferential bias block comprises a wedge defining a tip oriented outwardly along the radial direction.

9. The airfoil assembly according to claim 8,
wherein the first extension member and the second extension member each define a sloped surface, and
wherein the wedge is positioned between the sloped surfaces of the first and second extension members along the circumferential direction.

10. The airfoil assembly according to claim 7,
wherein the circumferential bias block comprises a wedge and a hook positioned at least partially between the first extension member of the first hub and the second extension member of the second hub, and
wherein the circumferential bias assembly further comprises a retention member positioned at least partially in a channel formed by the hook.

11. The airfoil assembly according to claim 1,
wherein each of the first hub and the second hub comprises ceramic matrix composite materials.

12. A turbine engine defining an axial direction, a radial direction, and a circumferential direction, comprising:
a compressor section;
a combustion section; and
a turbine section,
wherein the compressor section or the turbine section comprises the airfoil assembly of claim 1.

13. The turbine engine of claim 12,
wherein the circumferential bias assembly is a first shroud assembly, and
wherein the first shroud assembly comprises a spring member coupled to the first extension member, positioned adjacent to the first extension member, or both.

14. The turbine engine of claim 12,
wherein the circumferential bias assembly comprises a circumferential bias block positioned at least partially between the first extension member of the first hub and the second extension member of the second hub.

15. An airfoil assembly for a turbine engine defining an axial direction, a radial direction, and a circumferential direction, the airfoil assembly comprising:
a first airfoil defining a first end along the radial direction;
a first hub disposed on the first end of the first airfoil and comprising a first extension member extending at least partially in the radial direction;
a second airfoil adjacent to the first airfoil, the second airfoil defining a first end along the radial direction;
a second hub disposed on the first end of the second airfoil and comprising a second extension member extending at least partially in the radial direction;
a circumferential bias assembly operable with the first extension member, the second extension member, or both for exerting a circumferential force on the first extension member, the second extension member, or both, wherein the circumferential bias assembly is a first shroud assembly, and wherein the first shroud assembly comprises a first spring member coupled to the first extension member, positioned adjacent to the first extension member, or both; and
a second circumferential bias assembly configured as a second shroud assembly,
wherein the second shroud assembly comprises a second spring member coupled to the second extension member, positioned adjacent to the second extension member, or both, and
wherein the first spring member is configured to exert a circumferential load against the second hub.

16. The airfoil assembly according to claim 15,
wherein the first hub and the second hub are torsional springs, and
wherein the first hub exerts a torsional force on the second hub.

17. The airfoil assembly according to claim 15, further comprising:
a plurality of adjacent airfoils in addition to the first and second airfoils, wherein the plurality of adjacent airfoils comprises a third airfoil at one end of the plurality of adjacent airfoils and a fourth airfoil at the other end of the plurality of adjacent airfoils, wherein the third airfoil is adjacent to the second airfoil and the second spring member of the second airfoil exerts a circumferential load on a third hub disposed on the third airfoil, and wherein the fourth airfoil is adjacent to the first airfoil and a fourth spring member of the fourth airfoil exerts a circumferential load on the first hub.

18. An airfoil assembly for a turbine engine defining an axial direction, a radial direction, and a circumferential direction, the airfoil assembly comprising:

a first airfoil defining a first end along the radial direction;

a first hub disposed on the first end of the first airfoil and comprising a first extension member extending at least partially in the radial direction;

a second airfoil adjacent to the first airfoil, the second airfoil defining a first end along the radial direction;

a second hub disposed on the first end of the second airfoil and comprising a second extension member extending at least partially in the radial direction; and a circumferential bias assembly operable with the first extension member and the second extension member for exerting a circumferential force on at least one of the first extension member or the second extension member, wherein the circumferential bias assembly is operable with the first extension member to exert a first circumferential force on the first extension member in a first direction, wherein the circumferential bias assembly is operable with the second extension member to exert a second circumferential force on the second extension member in a second direction, and wherein the first direction is opposite of the second direction.

* * * * *